US012388745B2

(12) United States Patent
Jiang et al.

(10) Patent No.: US 12,388,745 B2
(45) Date of Patent: Aug. 12, 2025

(54) METHOD AND APPARATUS FOR PERFORMING PROTECTION SWITCHING IN SEGMENT ROUTING SR NETWORK

(71) Applicant: Huawei Technologies Co., Ltd., Shenzhen (CN)

(72) Inventors: Yuanlong Jiang, Shenzhen (CN); Fan Yang, Shenzhen (CN); Tianran Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 18/363,262

(22) Filed: Aug. 1, 2023

(65) Prior Publication Data

US 2023/0379246 A1 Nov. 23, 2023

Related U.S. Application Data

(63) Continuation of application No. PCT/CN2021/131085, filed on Nov. 17, 2021.

(30) Foreign Application Priority Data

Feb. 2, 2021 (CN) ......................... 202110143569.3
Feb. 10, 2021 (CN) ......................... 202110183845.9

(51) Int. Cl.
*H04L 45/00* (2022.01)
*H04L 45/28* (2022.01)
*H04L 45/74* (2022.01)

(52) U.S. Cl.
CPC ............ *H04L 45/566* (2013.01); *H04L 45/28* (2013.01); *H04L 45/74* (2013.01)

(58) Field of Classification Search
CPC ....... H04L 45/566; H04L 45/28; H04L 45/74; H04L 45/22; H04L 45/34
See application file for complete search history.

(56) References Cited

U.S. PATENT DOCUMENTS

2016/0308753 A1 10/2016 Hu et al.
2022/0103463 A1 * 3/2022 Margaria ................ H04L 45/24

FOREIGN PATENT DOCUMENTS

CN 103650421 A 3/2014
CN 113315697 A 8/2021
(Continued)

OTHER PUBLICATIONS

Z.Ali et al., "Operations, Administration, and Maintenance (OAM) in Segment Routing Networks with IPv6 Data plane (SRv6)", draft-ietf-6man-spring-srv6-oam-08, May 3, 2021, total 18 pages.
(Continued)

*Primary Examiner* — Philip C Lee
(74) *Attorney, Agent, or Firm* — Conley Rose, P.C.

(57) ABSTRACT

A protection switching method provides a manner of transferring a protection switching message on an SRv6 data plane. In this manner, a first node can switch, after a fault occurs on an end-to-end transmission path of forward service traffic of the first node, a transmission path of the forward service traffic of the first node to another end-to-end transmission path, and send the forward service traffic through the transmission path after switching. In this manner, the first node only needs to store information about the another transmission path, and an intermediate node does not need to maintain a large amount of path state information and path configuration information.

20 Claims, 13 Drawing Sheets

(56) References Cited

FOREIGN PATENT DOCUMENTS

| | | | | | |
|---|---|---|---|---|---|
| CN | 114629838 | A | * | 6/2022 | ............ H04L 43/10 |
| CN | 114698003 | A | * | 7/2022 | |
| EP | 3796605 | A1 | * | 3/2021 | ............ H04L 45/22 |
| WO | WO-2020156105 | A1 | * | 8/2020 | ......... H04L 12/4633 |
| WO | 2020247626 | A1 | | 12/2020 | |
| WO | WO-2022000264 | A1 | * | 1/2022 | ......... H04L 12/4633 |

OTHER PUBLICATIONS

W.Cheng et al., "Path Segment in MPLS Based Segment Routing Network", draft-ietf-spring-mpls-path-segment-03, Mar. 27, 2021, total 11 pages.

C.Li et al., "Path Segment for SRv6 (Segment Routing in IPv6)", draft-ietf-spring-srv6-path-segment-00, May 29, 2021, total 9 pages.

M.Bocci, Ed et al, "MPLS Generic Associated Channel", Request for Comments:5586, Jun. 2009, total 19 pages.

C.Filsfils, Ed.et al., "Segment Routing Architecture", Request for Comments:8402, Jul. 2018, total 32 pages.

A.Bashandy, Ed.et al., "Segment Routing with the MPLS Data Plane", RFC:8660, Dec. 2019, total 29 pages.

RFC: 3209, D. Awduche, el al, "RSVP-TE: Extensions to RSVP for LSP Tunnels," Dec. 2001, 61 pages.

RFC: 5718, D. Beller, et al, "An In-Band Data Communication Network For the MPLS Transport Profile," Jan. 2010, 8 pages.

RFC 6378, Y. Weingarten, Ed., "MPLS Transport Profile (MPLS-TP) Linear Protection" Oct. 2011, 45 pages.

RFC 7271, J. Ryoo, Ed., "MPLS Transport Profile (MPLS-TP) Linear Protection to Match the Operational Expectations of Synchronous Digital Hierarchy, Optical Transport Network, and Ethernet Transport Network Operators," Jun. 2014, 40 pages.

RFC 7347, H. Van Helvoort Ed, "Pre-standard Linear Protection Switching in MPLS Transport Profile (MPLS-TP)," Sep. 2014, 32 pages.

RFC 2460, S. Deering, et al, "Internet Protocol, Version 6 (IPv6) Specification," Jul. 2017, 42 pages.

RFC 8754, C. Filsfils, Ed., et al., "IPv6 Segment Routing Header (SRH)," Mar. 2020, 27 pages.

* cited by examiner

| Primary path information | | |
|---|---|---|
| Backup path information | | |
| Protection type | Reason for requesting protection switching | Path after switching |

| Ethernet header or internet protocol IP header |||
|---|---|---|
| Next header Next Header | Extension header length Hdr Ext Len | Routing type Routing Type | Segment left (SL) Segment Left (SL) |
| Segment list maximum identifier Last Entry | Flag Flags | Same class data packet tag Tag ||

MPLS label
MPLS label[0]

...

MPLS label
MPLS label[n-1]

Path segment
path segment 1

| Version ver | Request type request | Protection type PT | Switchback R | Reserved reserved | Fault path FPath | Path Path |
|---|---|---|---|---|---|---|
| Type length value length TLV length ||||| Reserved reserved ||

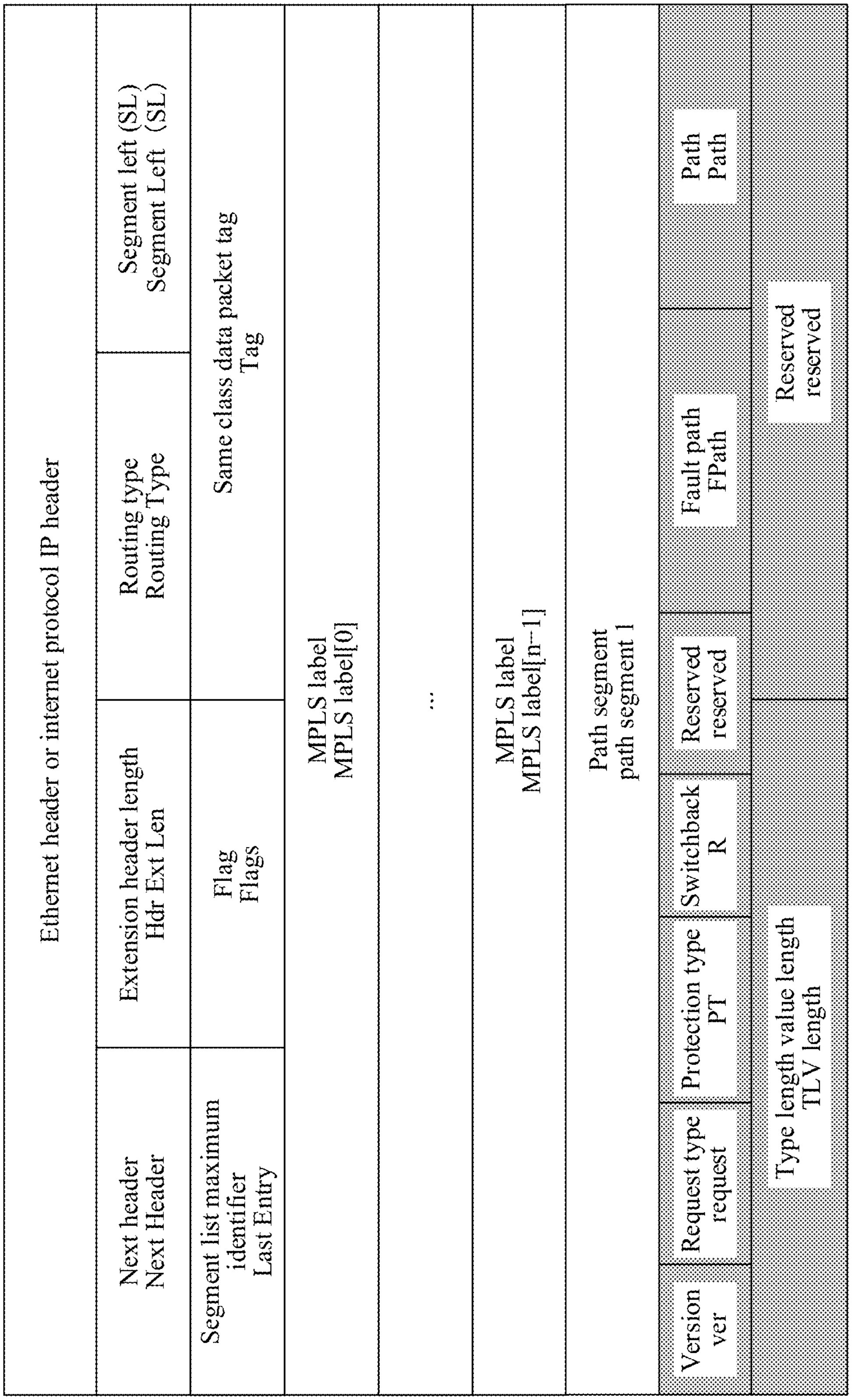

FIG. 5A

| Ethernet header or internet protocol IP header | | |
|---|---|---|
| Next header<br>Next Header | Extension header length<br>Hdr Ext Len | Routing type<br>Routing Type | Segment left (SL)<br>Segment Left (SL) |
| Segment list maximum identifier<br>Last Entry | Flag<br>Flags | Same class data packet tag<br>Tag | |
| MPLS label<br>MPLS label[0] | | | |
| ... | | | |
| MPLS label<br>MPLS label[n−1] | | | |
| Path segment<br>path segment 1 | | | |
| 0001 | Reserved | Automatic protection switching<br>APS | |
| Version<br>version | Request type<br>request | Protection type<br>PT | Switchback<br>R | Reserved<br>reserved | Fault path<br>FPath | Path<br>Path |
| Type length value length<br>TLV length | | | Reserved<br>reserved | | |

Associated channel header
ACH header

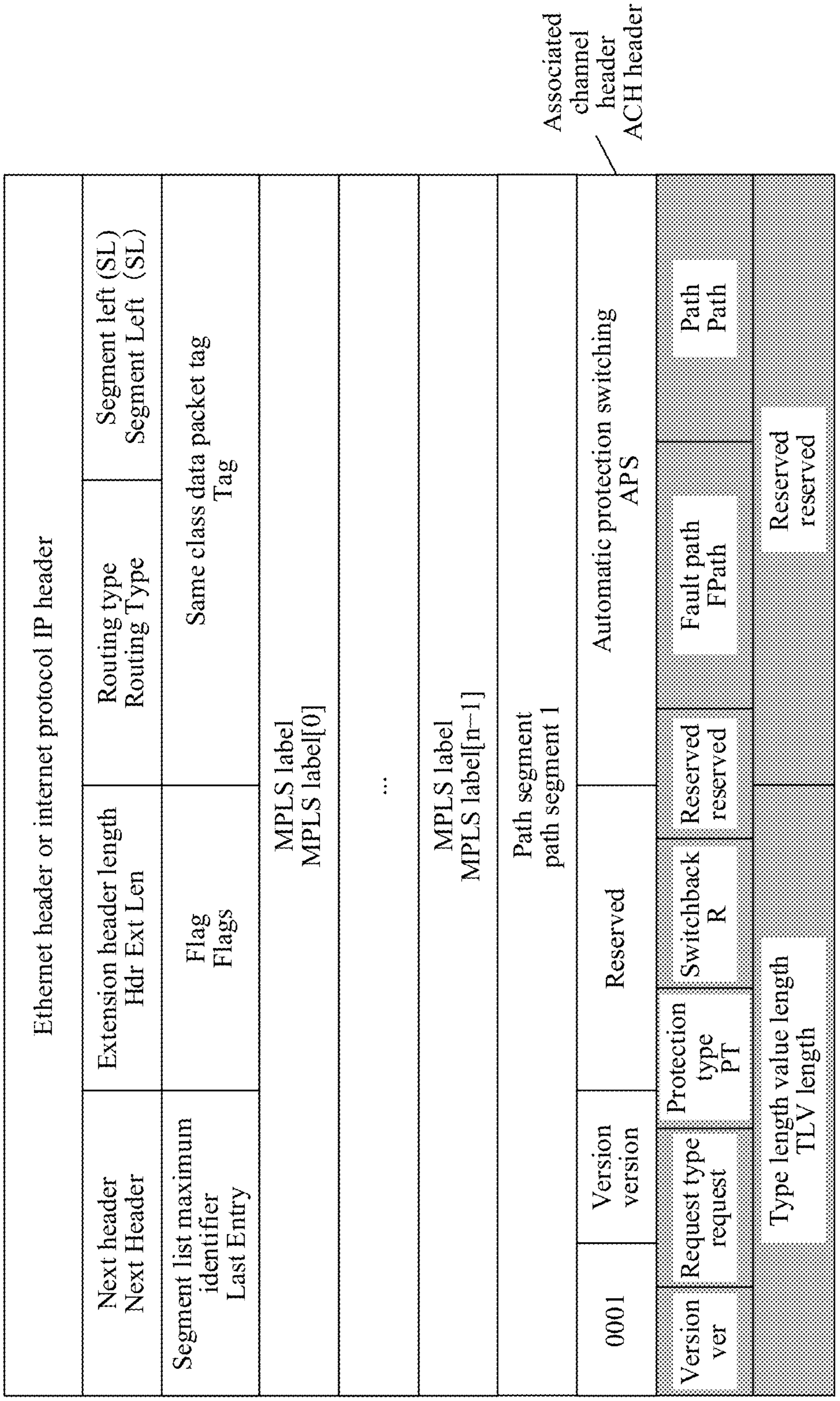

FIG. 5B

| Ethernet header or internet protocol IP header | | |
|---|---|---|
| Next header<br>Next Header | Extension header length<br>Hdr Ext Len | Segment left (SL)<br>Segment Left (SL) |
| Segment list maximum identifier<br>Last Entry | Flag<br>Flags | Routing type<br>Routing Type |
| Same class data packet tag<br>Tag | | |
| MPLS label<br>MPLS label[0] | | |
| ... | | |
| MPLS label<br>MPLS label[n−1] | | |
| Path segment<br>path segment 1 | | |
| Version<br>ver | Request type<br>request | Protection type<br>PT | Switchback<br>R | Reserved<br>reserved | Fault path<br>FPath | Path<br>Path |
| Type length value length<br>TLV length | | | | Reserved<br>reserved | | |
| Path segment<br>path segment 2 | | | | | | |

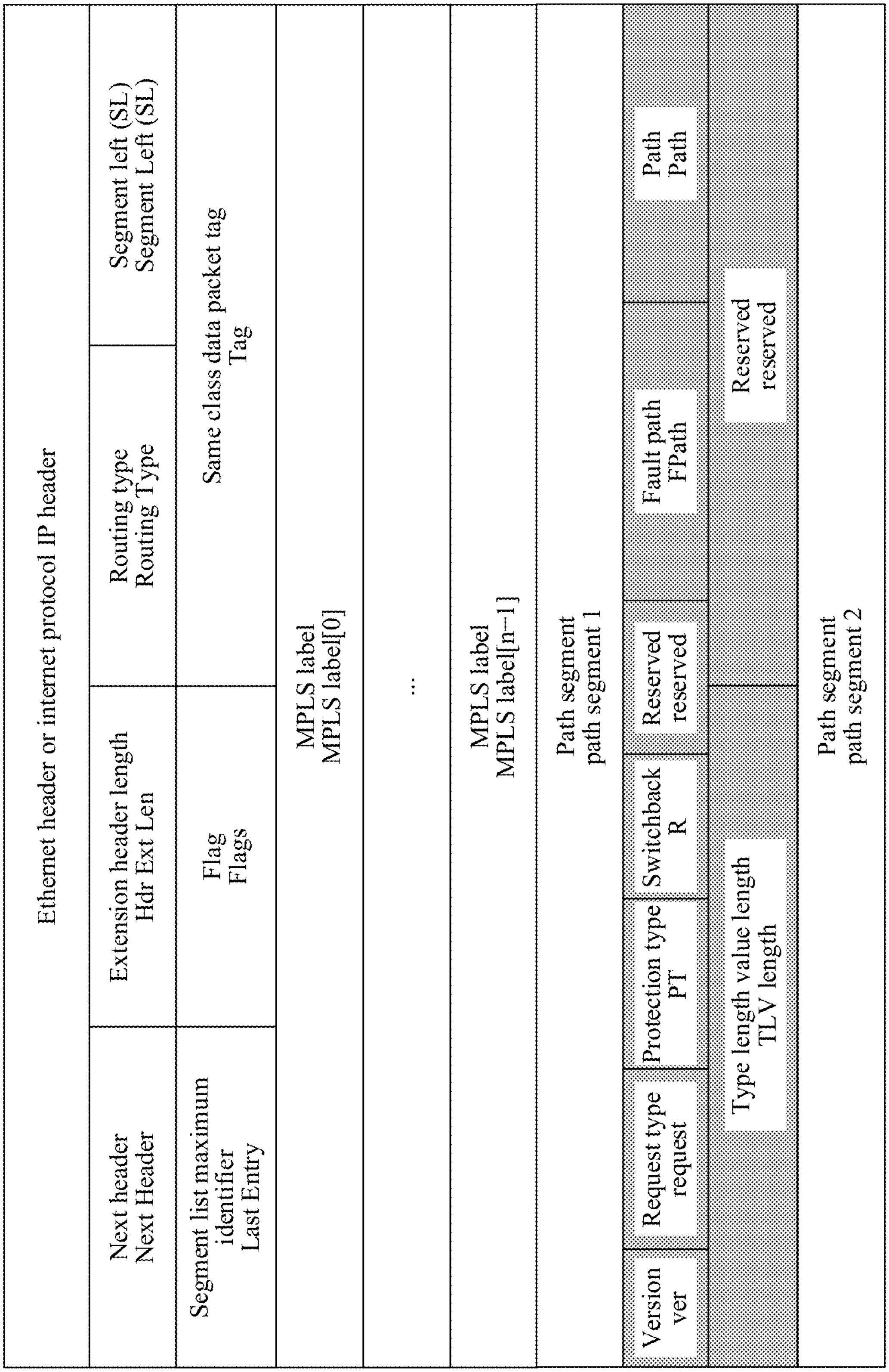

FIG. 5C

| Ethernet header or internet protocol IP header | | |
|---|---|---|
| Next header<br>Next Header | Extension header length<br>Hdr Ext Len | Routing type<br>Routing Type | Segment left (SL)<br>Segment Left (SL) |

| Ethernet header or internet protocol IP header |||| |
|---|---|---|---|
| Next header<br>Next Header | Extension header length<br>Hdr Ext Len | Routing type<br>Routing Type | Segment left (SL)<br>Segment Left (SL) |
| Segment list maximum identifier<br>Last Entry | Flag<br>Flags | Same class data packet tag<br>Tag ||
| MPLS label<br>MPLS label[0] ||||
| ... ||||
| MPLS label<br>MPLS label[n−1] ||||
| Path segment<br>path segment 1 ||||
| Automatic protection switching APS ||||
| Reserved | Switchback<br>R | Reserved<br>reserved | Fault path<br>FPath | Path<br>Path |

Associated channel header ACH header:

| 0001 | Version<br>version | Reserved | Switchback R | Reserved<br>reserved |
|---|---|---|---|---|
| Version<br>ver | Request type<br>request | Protection type<br>PT | Fault path<br>FPath | Path<br>Path |
| Type length value length<br>TLV length |||| Reserved<br>reserved |
| Path segment<br>path segment 2 |||||

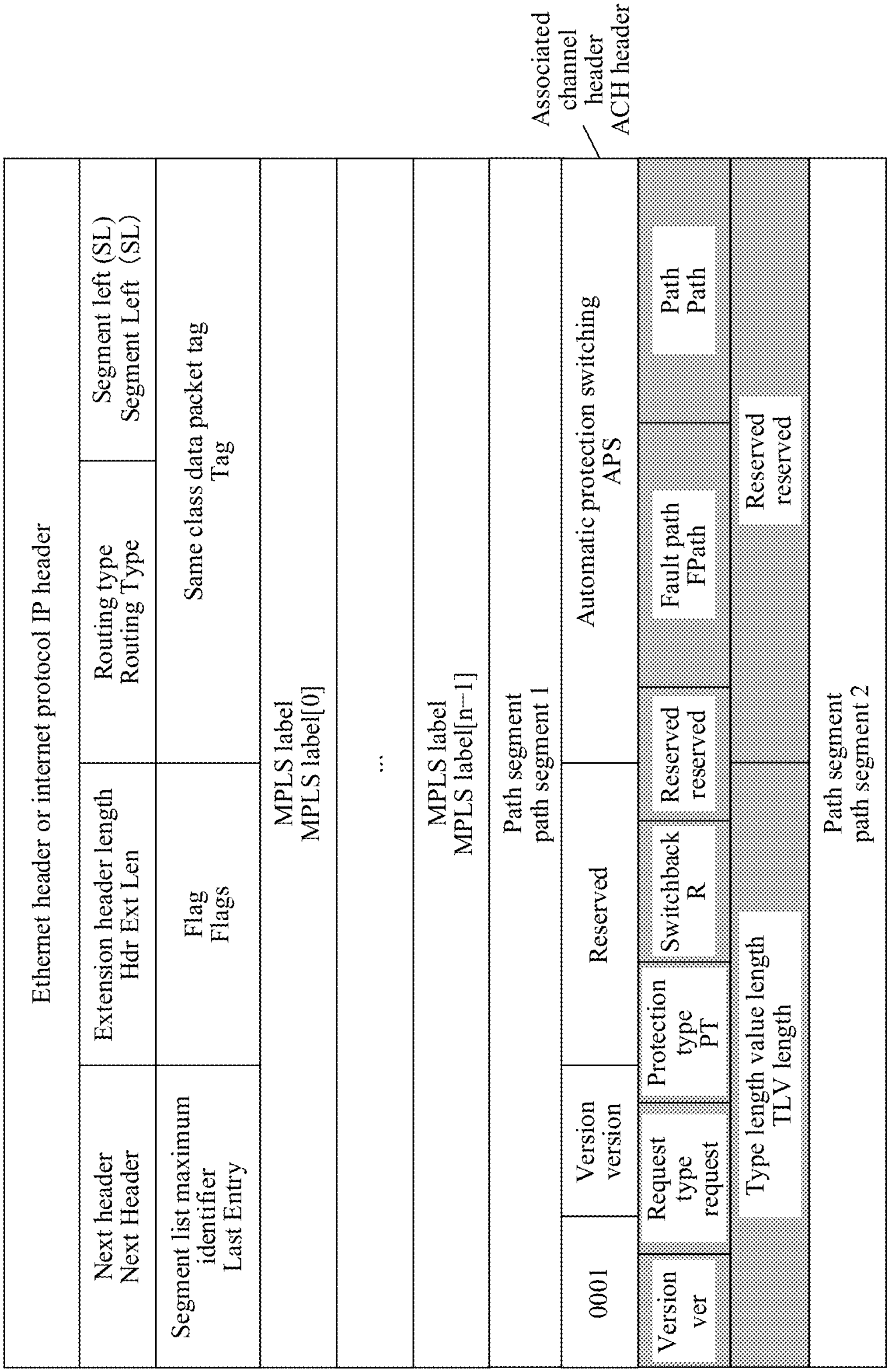

FIG. 5D

METHOD AND APPARATUS FOR PERFORMING PROTECTION SWITCHING IN SEGMENT ROUTING SR NETWORK

CROSS-REFERENCE TO RELATED APPLICATIONS

This application is a continuation of International Patent Application No. PCT/CN2021/131085 filed on Nov. 17, 2021, which claims priority to Chinese Patent Application No. 202110143569.3 filed on Feb. 2, 2021, and Chinese Patent Application No. 202110183845.9 filed on Feb. 10, 2021. All of the aforementioned patent applications are hereby incorporated by reference in their entireties.

TECHNICAL FIELD

The present disclosure relates to the communication field, and in particular, to a protection switching method and apparatus.

BACKGROUND

Segment routing (SR) is a protocol designed based on an idea of source routing to forward data packets on a network. SR types include Segment Routing with Multi-Protocol Label Switching (SR-MPLS) and Segment Routing over IPv6 (SRv6). To avoid traffic transmission interruption caused by a fault on a node and/or link in a current transmission path, traffic transmission needs to be protected. A known technology is topology-independent loop-free alternate (TI-LFA) protection based on Segment Routing. Theoretically, TI-LFA can support node and link protection in any topology and can implement fast reroute (FRR) protection. TI-LFA determines a non-primary next-hop neighboring node for each link or each next-hop node on a forwarding path. If a shortest path from the neighboring node to a destination node does not pass through a source node, the neighboring node is used as a loop-free alternate next-hop node.

However, in a TI-LFA-based protection technology, a corresponding protection path usually needs to be calculated for each node or each link and installed on each intermediate node. Intermediate nodes need to maintain a large amount of path state information and path configuration information. A configuration of the intermediate nodes is complex and requires high processing capabilities of intermediate nodes. Operation and maintenance management is difficult.

Therefore, in an SR network, how to provide a simple and efficient protection switching mechanism becomes one of problems that need to be solved currently.

SUMMARY

Embodiments of the present disclosure provide a protection switching method, to provide a mechanism for performing protection switching on an end-to-end SRv6 path. In this mechanism, an intermediate node does not need to maintain a large amount of path state information and path configuration information.

According to a first aspect, an embodiment of the present disclosure provides a protection switching method. For example, the method may be performed by a first communication apparatus, and the first communication apparatus may correspond to a head node or an intermediate node on a first path. In an example, the first communication apparatus may obtain a first SRv6 packet (in the present disclosure, an SRv6 packet is an IPv6 packet with a segment routing header (SRH)), and the first SRv6 packet includes a first protection switching message. After obtaining the first protection switching message, the first communication apparatus may send the first SRv6 packet to a tail node of the first path. The first path mentioned herein is a path used for forwarding the first SRv6 packet. The first protection switching message may be used for requesting the tail node of the first path to perform path switching. It can be learned that, through this solution, the tail node of the first path can be requested to perform path switching, so that when a fault occurs on a path, the tail node can switch service traffic to another path, to ensure quality of service of the service traffic. In addition, when the tail node of the first path is requested by using the first protection switching message to perform path switching, the tail node may switch the service traffic to a backup path based on the first protection switching message, and the intermediate node does not need to maintain a large amount of path state information and path configuration information, so that a requirement of a data processing capability of the intermediate node can be reduced.

In an implementation, the first protection switching message may be carried in a protocol payload of the first SRv6 packet.

In an implementation, the first protection switching message may be carried in an extension header of the first SRv6 packet. The extension header mentioned herein may be an HBH option header, a DOH, or an SRH.

In an implementation, in addition to the first protection switching message, the first SRv6 packet may further include first indication information, and the first indication information indicates the first protection switching message. In this way, the tail node of the first path may determine, based on the first indication information, that the first SRv6 packet includes the first protection switching message.

In an implementation, the first indication information indicating the first protection switching message may be a first path identifier. The first path identifier is used for identifying the first path. In this manner, other meanings other than identifying the first path may be assigned to the first path identifier. In this case, the tail node of the first path may determine, based on the first path identifier, that the first SRv6 packet includes the first protection switching message.

In an implementation, after a fault occurs on the second path, the first communication apparatus may send the first SRv6 packet to the tail node of the first path, to request the tail node of the first path to switch a transmission path of traffic from the second path to a third path. The second path and the third path have a same head node and tail node, the tail node of the first path is a head node of the second path, and a head node of the first path is a tail node of the second path. In this case, the first SRv6 packet may include an identifier of a to-be-switched path, that is, an identifier of the second path. In an example, a same identifier may be used for the first path and the second path. In other words, the first path identifier is further used for identifying the second path, and the first protection switching message is used for requesting the tail node of the first path to switch the transmission path of traffic from the second path to the third path. In this case, based on a first path identifier, the tail node may determine that the first SRv6 packet includes the first protection switching message, and may also determine that the first protection switching message is used for requesting the tail node of the first path to switch the transmission path of traffic from the second path to the third path.

In an implementation, it is considered that the second path may be used to transmit a plurality of types of service traffic, and different types of service traffic may have different quality of service requirements. To meet quality of service of service traffic having a high quality of service requirement as much as possible, in an example, after the fault occurs on the second path, a transmission path of the service traffic having a high quality of service requirement may be preferentially switched from the second path to the third path. In this case, the first SRv6 packet may further carry an identifier of at least one service transmitted on the second path. In this way, the first protection switching message may be used for requesting the tail node of the first path to switch a transmission path of the at least one service from the second path to the third path.

In an implementation, the identifier of the at least one service transmitted on the second path may be carried by using the first path identifier. In this way, based on the first path identifier, the tail node may determine that the first SRv6 packet includes the first protection switching message, and may also determine that the first protection switching message is used for requesting the tail node of the first path to switch the transmission path of the at least one service from the second path to the third path.

In an implementation, for an SRv6 packet, a segment list included in an SRH of the SRv6 packet may include a path segment field. The path segment field is used for carrying a path segment identifier, and a value of the path segment identifier is used for identifying an SRv6 path. Therefore, in an example, the first path identifier may be a first path segment identifier used for identifying the first path.

In an implementation, the identifier of the second path and the identifier of the first path may be different identifiers. In this case, the first SRv6 packet may further include a second path identifier, where the second path identifier is used for identifying the second path. In this way, the tail node of the first path may determine, based on the second path identifier, that the first protection switching message is used for requesting the tail node of the first path to switch a transmission path of traffic from the second path to a third path, the second path and the third path have a same head node and tail node, the tail node of the first path is a head node of the second path, and a head node of the first path is a tail node of the second path.

In an implementation, to preferentially switch a transmission path of service traffic having a high quality of service requirement from the second path to the third path after the fault occurs on the second path, the second path identifier is further used for identifying at least one service transmitted on the second path. In this way, based on the second path identifier, the tail node may determine that the first protection switching message is used for requesting the tail node of the first path to switch the transmission path of the at least one service from the second path to the third path.

In an implementation, the second path identifier is a second path segment identifier.

In an implementation, to implement co-routed forward and reverse paths of the service, after receiving the first SRv6 packet, the tail node of the first path may send a second SRv6 packet to the head node of the first path through the third path, where the second SRv6 packet includes a second protection switching message, and the second protection switching message is a response message of the first protection switching message. In an example, after receiving the second SRv6 packet, the head node of the first path may switch, based on the second protection switching message, a transmission path for sending a packet by the head node of the first path from a fourth path to the first path. The first path and the third path mentioned herein are co-routed reverse paths. In this way, forward and reverse paths can be co-routed.

In an implementation, both the first indication information and the first protection switching message may be carried in the extension header of the first SRv6 packet. In an example, a first TLV field may be extended in the extension header of the first SRv6 packet, and the extended TLV field is used for carrying the first indication information and the first protection switching message.

In an implementation, in addition to the first protection switching message, the first TLV no longer carries a control management message of another type.

In an implementation, in addition to the first protection switching message, the first TLV may further carry a control management message of another type. In this case, the first TLV is an associated channel TLV, the associated channel TLV includes a channel type field, the channel type field is used for carrying the first indication information, and a value field of the associated channel TLV is used for carrying the first protection switching message.

In an implementation, the first SRV6 packet includes an associated channel, the associated channel is capable of carrying different types of control channels, one type of control channel is a protection switching channel, and the protection switching channel is used for carrying the first indication information and the first protection switching message. In this manner, a plurality of different control and management functions may be implemented through the associated channel.

In an implementation, in addition to the associated channel, the first SRV6 packet may further include second indication information, and the second indication information indicates the associated channel. In this way, a node that receives the first SRV6 packet may determine, based on the second indication information, that the first SRV6 packet includes the associated channel.

In an implementation, the at least one control channel carried by the associated channel may include, for example, one or more of an OAM channel, a fault indication channel, a resource management channel, a signaling communication channel SCC, and a management communication channel MCC. The control management message carried by the OAM channel may be, for example, an OAM message, where the OAM message is a general term of a series of messages for implementing operation, maintenance, and management on an end-to-end IPv6 path such as an SRv6 path. The control management message carried by the fault indication channel may be, for example, a fault indication message, where the fault indication message is used for recording fault indication information of the first path. The control management message carried by the resource management channel may be, for example, a resource management message, used for implementing resource management on a path such as the first path. The SCC is used for providing a separate channel between two nodes on an IPv6 path to transfer control information. The MCC is used for providing a separate channel between two nodes on an IPv6 path to transfer management information.

In an implementation, the control management message carried by the resource management channel may include, for example, one or more of a resource reservation request message, a resource status update message, and a resource reservation cancellation message. The resource reservation request message is used for indicating a node on the first path to reserve a resource. The resource status update message is used for collecting an available resource of a node on the first path. The resource reservation cancellation message is used for canceling a resource reservation request. The first path mentioned herein is a transmission path of a first IPv6 packet. It may be understood that, when the control channel carried by the associated channel includes the resource management channel, the first IPv6 packet includes a resource reservation request message, a resource status update message, or a resource reservation cancellation message.

In an implementation, the first protection switching message may be an APS message, or may be a PSC message.

In an implementation, a user-defined APS message may include a protection type field, a reason field for requesting protection switching, and a path field after switching. The protection type field indicates a type of a protection protocol, and the reason field for requesting protection switching indicates a reason for requesting a tail node of the first SRv6 packet to perform path switching. The path field after switching indicates a path after switching based on indication information. The tail node of the first SRv6 packet may switch, based on information path after switching, service traffic to the path after switching. Optionally, the APS message may further include a primary path information field and a backup path information field, where the primary path information field is used for carrying information about a primary path, and the backup path information field is used for carrying information about a backup path. The path after switching is the primary path or the backup path.

According to a second aspect, an embodiment of the present disclosure provides a protection switching method. The method may be performed by a first communication apparatus, and the first communication apparatus may correspond to a tail node on a first path. In an example, the first communication apparatus may receive a first SRv6 packet, where the first SRv6 packet includes a first protection switching message. After receiving the first protection switching message, the first communication apparatus may perform a corresponding operation based on the first protection switching message. The first path mentioned herein is a path for forwarding the first SRv6 packet. The first APS message may be used for requesting the tail node of the first path to perform path switching. It can be learned that, through this solution, the tail node can perform path switching based on a request of the first protection switching message, so that when a fault occurs on a path, the tail node can switch service traffic to another path, to ensure quality of service of the service traffic. In addition, when the tail node of the first path is requested by using the first protection switching message to perform path switching, the tail node may switch the service traffic to a backup path based on the first protection switching message, and the intermediate node does not need to maintain a large amount of path state information and path configuration information, so that a requirement of a data processing capability of the intermediate node can be reduced.

In an implementation, the first APS message is used for requesting a tail node of a first path to switch a transmission path of traffic from a second path to a third path, the second path and the third path have a same head node and tail node, the tail node of the first path is a head node of the second path, a head node of the first path is a tail node of the second path, and the first path is a path used for forwarding the first SRv6 packet.

In an implementation, if the first APS message is used for requesting the tail node of the first path to switch the transmission path of traffic from the second path to the third path, the first communication apparatus may switch the transmission path of traffic from the second path to the third path based on the first APS message, to avoid impact on normal transmission of the service traffic due to a fault on the second path.

In an implementation, to implement co-routed forward and reverse paths of the service, after receiving the first SRv6 packet, the tail node of the first path may send a second SRv6 packet to the head node of the first path through the third path, where the second SRv6 packet includes a second protection switching message, and the second protection switching message is a response message of the first protection switching message. In an example, after receiving the second SRv6 packet, the head node of the first path may switch, based on the second protection switching message, a transmission path for sending a packet by the head node of the first path from a fourth path to the first path. The first path and the third path mentioned herein are co-routed reverse paths. In this way, forward and reverse paths can be co-routed.

According to a third aspect, an embodiment of the present disclosure provides a protection switching method, and the method may be applied to a first node. In an example, after a fault occurs on a first SRv6 path, the first node may switch a sending path of forward service traffic of the first node from the first SRv6 path to a second SRv6 path, and send the forward service traffic through the second SRv6 path. The forward service traffic is service traffic sent by the first node to a second node, the first SRv6 path is a path between the first node and the second node, the first node is a head node of the first SRv6 path, the second node is a tail node of the first SRv6 path, and the first SRv6 path and the second SRv6 path have a same head node and tail node. In other words, the first SRv6 path and the second SRv6 path may provide backup for each other. It can be learned that, through this solution, after a fault occurs on the first SRv6 path, the first node may switch forward service traffic originally forwarded through the first SRv6 path to the second SRv6 path for forwarding, to ensure quality of service of the forward service traffic.

In an implementation, after the fault occurs on the first SRv6 path, in addition to switching the sending path of the forward service traffic, the first node may further switch a receiving path of reverse service traffic. In an example, the first node may further switch the receiving path of the reverse service traffic of the first node from a third SRv6 path to a fourth SRv6 path, and receive the reverse service traffic through the fourth SRv6 path. The reverse service traffic is traffic sent by the second node to the first node, a head node of the third SRv6 path is the second node, a tail node of the third SRv6 path is the first node, and the third SRv6 path and the fourth SRv6 path have a same head node and tail node. In an example, the fourth SRv6 path and the second SRv6 path are bidirectional co-routed paths. In this way, forward and reverse paths can be co-routed.

In an implementation, the first node may prestore a first segment list, and the first segment list is used for describing a set of segment identifiers SIDs of the second SRv6 path. When sending the forward service traffic through the second SRv6 path, the first node may encapsulate the forward service traffic by using the first segment list.

In an implementation, the first node may switch, based on a first SRv6 packet sent by the second node, a transmission path of the forward service traffic from the first SRv6 path to the second SRv6 path. The first SRv6 packet includes a first protection switching message. After receiving the first SRv6 packet, the first node may switch the transmission path of the forward service traffic from the first SRv6 path to the second SRv6 path based on the first protection switching message.

In an implementation, the first SRv6 packet includes first information. The first information indicates a to-be-switched path. In other words, the first information is used for identifying the first SRv6 path. After receiving the first SRv6 packet, the first node may determine, based on the first information, that the first protection switching message is used for requesting the first node to switch the transmission path of the forward service traffic from the first SRv6 path to the second SRv6 path.

In an implementation, the first node may prestore a correspondence between the first information and the first segment list. In this way, after receiving the first SRv6 packet including the first information, the first node may determine, based on the correspondence, the first segment list indicating a path after switching.

In an implementation, after the first node determines, based on the correspondence, the first segment list that indicates the path after switching, if forward service traffic needs to be sent, the first node may encapsulate the forward service traffic by using the first segment list, to send the forward service traffic through the second SRv6 path.

In an implementation, the first information may be a first path segment identifier indicating the first SRv6 path.

According to a fourth aspect, the present disclosure provides a communication apparatus, including a transceiver unit and a processing unit. The transceiver unit is configured to perform the sending and receiving operations according to any one of the first aspect or the implementations of the first aspect, and the processing unit is configured to perform another operation other than the sending and receiving operations according to any one of the first aspect or the implementations of the first aspect. Alternatively, the transceiver unit is configured to perform the sending and receiving operations according to any one of the second aspect or the implementations of the second aspect, and the processing unit is configured to perform another operation other than the sending and receiving operations according to any one of the second aspect or the implementations of the second aspect. Alternatively, the transceiver unit is configured to perform the sending and receiving operations according to any one of the third aspect or the implementations of the third aspect, and the processing unit is configured to perform another operation other than the sending and receiving operations according to any one of the third aspect or the implementations of the third aspect.

According to a fifth aspect, the present disclosure provides a communication apparatus. The communication apparatus includes a memory and a processor. The memory is configured to store program code. The processor is configured to run instructions in the program code, so that the communication apparatus performs the method according to any one of the first aspect or the implementations of the first aspect, or the communication apparatus performs the method according to any one of the second aspect or the implementations of the second aspect, or the communication apparatus performs the method according to any one of the third aspect or the implementations of the third aspect.

According to a sixth aspect, the present disclosure provides a communication apparatus. The communication apparatus includes a communication interface and a processor. The communication interface is configured to perform the sending and receiving operations according to any one of the first aspect and the implementations of the first aspect, and the processor is configured to perform another operation other than the sending and receiving operations according to any one of the first aspect or the implementations of the first aspect. Alternatively, the communication interface is configured to perform the sending and receiving operations according to any one of the second aspect or the implementations of the second aspect, and the processor is configured to perform another operation other than the sending and receiving operations according to any one of the second aspect or the implementations of the second aspect. Alternatively, the communication interface is configured to perform the sending and receiving operations according to any one of the third aspect or the implementations of the third aspect, and the processor is configured to perform another operation other than the sending and receiving operations according to any one of the third aspect or the implementations of the third aspect.

According to a seventh aspect, the present disclosure provides a computer-readable storage medium. The computer-readable storage medium stores instructions. When the instructions are run on a computer, the computer is enabled to perform the method according to any one of the first aspect or the implementations of the first aspect, or the computer is enabled to perform the method according to any one of the second aspect or the implementations of the second aspect, or the computer is enabled to perform the method according to any one of the third aspect or the implementations of the third aspect.

According to an eighth aspect, the present disclosure provides a communication system. The communication system includes the communication apparatus according to the fourth aspect, the fifth aspect, or the sixth aspect and performing the method according to any one of the first aspect or the implementations of the first aspect, and the communication apparatus according to the fourth aspect, the fifth aspect, or the sixth aspect and performing the method according to any one of the second aspect or the implementations of the second aspect.

According to a ninth aspect, the present disclosure provides a communication system. The communication system includes the communication apparatus according to the fourth aspect, the fifth aspect, or the sixth aspect and performing the method according to any one of the first aspect or the implementations of the first aspect, and the communication apparatus according to the fourth aspect, the fifth aspect, or the sixth aspect and performing the method according to any one of the third aspect or the implementations of the third aspect.

BRIEF DESCRIPTION OF DRAWINGS

To describe the technical solutions in embodiments of the present disclosure more clearly, the following briefly describes the accompanying drawings used for describing embodiments or the conventional technology. It is clear that the accompanying drawings in the following descriptions show some embodiments of the present disclosure, and a person of ordinary skill in the art may still derive other drawings from these accompanying drawings without creative efforts.

FIG. 5A is a schematic diagram of a structure of a packet 1 according to an embodiment of the present disclosure;

FIG. 5B is a schematic diagram of a structure of a packet 1 according to an embodiment of the present disclosure;

FIG. 5C is a schematic diagram of a structure of a packet 1 according to an embodiment of the present disclosure;

FIG. 5D is a schematic diagram of a structure of a packet 1 according to an embodiment of the present disclosure;

DESCRIPTION OF EMBODIMENTS

An embodiment of the present disclosure provides a packet processing method, to provide a mechanism for performing linear protection switching on an end-to-end SRv6 path.

For an end-to-end SRv6 path, for example, a first path, if a fault occurs on any physical link or intermediate node on the first path, service traffic originally transmitted through the first path cannot be normally transmitted, and quality of service is affected.

Currently, SRv6 usually uses a fast reroute mechanism to implement protection against a fault on a link or node. Before a fault occurs on the first path, for each intermediate node and each physical link on the first path, a local loop-free path needs to be calculated to bypass the intermediate node or the physical link, so that when a fault occurs on the intermediate node or the physical link, service traffic is transmitted through the corresponding local loop-free path. In an example, for each intermediate node on the first path, a next hop that is not on a shortest forwarding path needs to be calculated. When the calculated next hop does not pass through a head node of the first path, the calculated next hop is used as a next hop of the intermediate node on a backup path.

However, this local rerouting protection mode requires that an intermediate node store a local rerouting protection path, and complexity of an intermediate node in a network is high. However, it is difficult for an operation and maintenance engineer to trace a detour path after rerouting protection. In addition, it is difficult to ensure, by using a fast reroute technology, that forward and reverse paths of a service are co-routed, that is, it cannot be ensured that the forward and reverse paths of the service pass through a same intermediate node and link set. Therefore, the fast reroute technology does not meet a special requirement of bidirectional co-routing of transport services such as frequency/time synchronization.

Figure 1A:
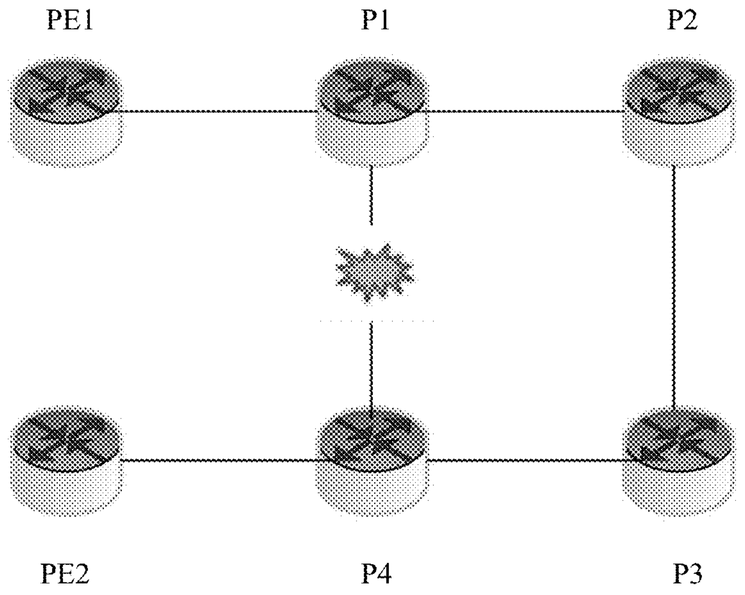
FIG. 1A is a schematic diagram of an example application scenario.

The foregoing fast reroute mechanism is described with reference to FIG. 1A. FIG. 1A is a schematic diagram of an example application scenario.

As shown in FIG. 1A, a provider edge device (provider edge, PE) PE1 is connected to a provider backbone device (provider, P) P1, P1 is connected to P2 and P4, P2 is connected to P3, P3 is connected to P4, and P4 is connected to PE2. PE1-P1-P4-PE2 is an optimal path between PE1 and PE2. In an example, the node P2 maintains a segment list of a path P2-P3-P4. When a fault occurs on a link P1-P4, P2 may switch traffic sent to P4 to the path P2-P3-P4 for forwarding. Certainly, FIG. 1A is provided only for ease of understanding. For a network with a more complex network structure, an amount of path configuration information maintained by an intermediate node, for example, P1, is far larger than an information amount of the foregoing segment list P2-P3-P4, and the node P1 further needs to maintain a large amount of path state information.

It should be noted that, in embodiments of the present disclosure, a segment list in the SRv6 packet indicates a transmission path of the SRv6 packet. The segment list may include a plurality of segment identifiers (SIDs). One SID indicates an intermediate node that the transmission path passes through, or one SID indicates an SRv6 adjacent link included in the transmission path. An adjacent link between two nodes is a link used for direct communication between the two nodes. When one node sends a packet to another node through the adjacent link, the another node is a next hop of the preceding node.

If end-to-end protection switching can be directly performed on the first path when a fault occurs on the first path, and the service traffic originally transmitted on the first path is switched to a backup path for transmission, normal transmission of the service traffic originally transmitted on the first path can be ensured by storing, on an edge node, only information of the backup path, for example, a segment list corresponding to the backup path, and an intermediate node does not need to maintain a large amount of path state information and path configuration information, so that better service management and operation and maintenance experience can be provided. In an example, a requirement of transport services such as frequency/time synchronization in forward and reverse co-routing may be further met, and this is more beneficial for an SRv6 network to provide a carrier-class service.

In view of this, an embodiment of the present disclosure provides an end-to-end protection switching method, so that protection switching can be performed on an end-to-end SRv6 path without requiring an intermediate node providing local re-routing protection. With reference to the application scenario shown in FIG. 1B, an end-to-end protection switching method provided in embodiments of the present disclosure is described below.

Figure 1B:
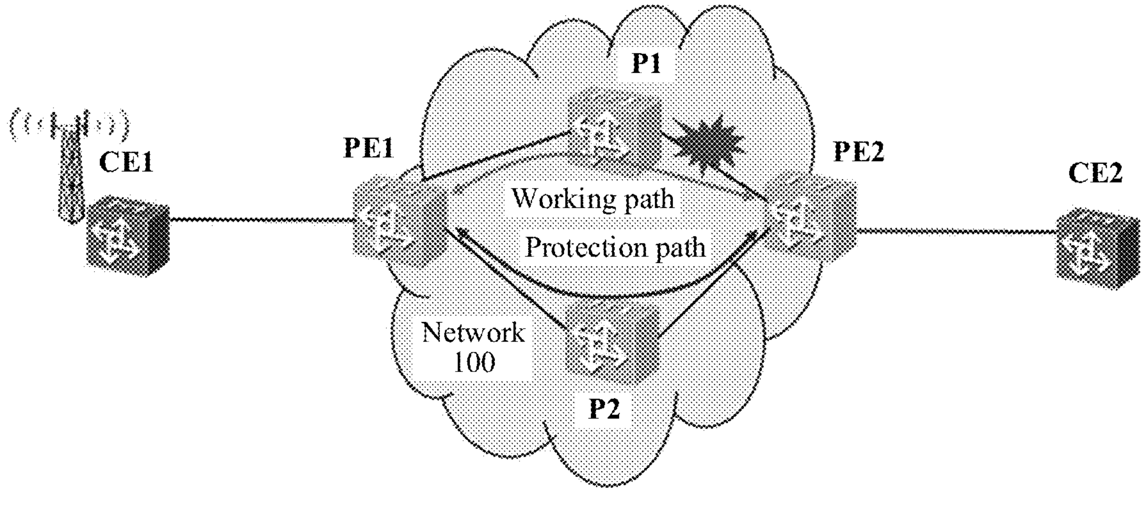
FIG. 1B is a schematic diagram of an example application scenario according to an embodiment of the present disclosure.

FIG. 1B is a schematic diagram of an example application scenario according to an embodiment of the present disclosure.

As shown in FIG. 1B, a customer edge device (customer edge, CE) CE1 may communicate with CE2 through a network 100. In an example, the network 100 may be an SRv6 network.

PE1, PE2, P1, and P2 are nodes on the SRv6 network.

PE1 may send a packet to PE2 through a path PE1-P1-PE2, or PE1 may send a packet to PE2 through a path PE1-P2-PE2. The path PE1-P1-PE2 and the path PE1-P2-PE2 provide backup for each other. In an example, the path PE1-P1-PE2 may be referred to as a working path or a primary path, and the path PE1-P2-PE2 may be referred to as a protection path or a backup path.

Similarly, PE2 may send a packet to PE1 through a path PE2-P1-PE1, or PE2 may send a packet to PE1 through a path PE2-P2-PE1. The path PE2-P1-PE1 and the path PE2-P2-PE1 provide backup for each other. In an example, the path PE2-P1-PE1 may be referred to as a working path or a primary path, and correspondingly, the path PE2-P2-PE1 may be referred to as a protection path or a backup path.

In the scenario shown in FIG. 1B, the paths PE1-P1-PE2 and PE2-P1-PE1 are bidirectional co-routed, and the paths PE1-P2-PE2 and PE2-P2-PE1 are bidirectional co-routed. That the two paths are bidirectional co-routed paths refers to that the two paths include a same set of nodes, but nodes appear in reverse orders on the two transmission paths that are co-routed reverse paths of each other. The bidirectional co-routed paths may also be referred to as co-routed reverse paths. In the present disclosure, the two terms are often used interchangeably.

The protection switching method provided in embodiments of the present disclosure may be applied to the scenario shown in FIG. 1B. When the protection switching method provided in embodiments of the present disclosure is applied to the scenario shown in FIG. 1B, when a fault occurs on the path PE2-P1-PE1 (that is, when a fault occurs on any one or more physical links or any one or more intermediate nodes), service traffic originally transmitted through the path PE2-P1-PE1 may be switched to the path PE2-P2-PE1 for transmission. Further, in a bidirectional co-routed network scenario, service traffic originally transmitted through the path PE1-P1-PE2 may be further switched to the path PE1-P2-PE2 for transmission.

It should be noted that, FIG. 1B is only a schematic diagram of an example application scenario according to an embodiment of the present disclosure, and does not constitute a limitation on embodiments of the present disclosure. The scenario shown in FIG. 1B may be applied to a 1:1 protection switching scenario or a 1+1 protection switching scenario. The solution provided in embodiments of the present disclosure may be further applied to a 1:n protection switching scenario.

1:1 protection switching refers to that one working path corresponds to one protection path, and service traffic is not transmitted on the protection path, or other service traffic is transmitted on the protection path. A priority of the other service traffic is lower than a priority of the service traffic transmitted on the working path.

1+1 protection switching refers to that one working path corresponds to one protection path, and service traffic is transmitted on both the protection path and the working path.

1:n protection switching refers to that n working paths correspond to one shared protection path.

In some examples, edge nodes such as PE1 and PE2 of the network 100 shown in FIG. 1B may locally store a correspondence between a service and service encapsulation information, for example, may store a correspondence between a service identifier and service encapsulation information. When receiving a service packet from a user side device (for example, CE1), an edge node (for example, PE1) may determine encapsulation information corresponding to the service packet based on the correspondence, to encapsulate the service packet. The service identifier mentioned herein may be, for example, an identifier number of a service, for example, a service number, or may be another character string. This is not specifically limited in embodiments of the present disclosure. The service identifier may be carried in a path segment field mentioned below, or may be carried in another field different from the path segment field. In an example, when the service identifier is a service number, the service identifier may be carried in a path segment field. When the service identifier is another character string, the service identifier may be carried in another field different from the path segment field. The service encapsulation information mentioned herein includes encapsulation information and service information of a service packet. The encapsulation information of the service packet includes, for example, but not limited to, IPv6. The service information includes, but not limited to, one or more of service related information, for example, a virtual local area network (VLAN) identifier and an Internet Protocol version 4 (IPv4) address prefix of a local area network.

The protection switching method provided in embodiments of the present disclosure may be applied to the scenario shown in FIG. 1B. In an example, a path PE1-P2-PE2 is referred to as a path 1, a path PE2-P1-PE1 is referred to as a path 2, a path PE2-P2-PE1 is referred to as a path 3, and a path PE1-P1-PE2 is referred to as a path 4. An example is as follows:

After a fault occurs on the path 2, a tail node of the path 1 may switch a sending path of forward service traffic of the tail node of the path 1 from the path 2 to the path 3, and send the forward service traffic through the path 3. An SRv6 packet sent through the path 3 includes a segment list indicating the path 3. Correspondingly, a head node of the path 1 may switch a receiving path of the forward service traffic from the path 2 to the path 3, and receive the forward service traffic through the path 3. For ease of description, the tail node of the path 1 is referred to as a first node, and the head node of the path 1 is referred to as a second node. In this case, forward service traffic of the first node is service traffic sent by the first node to the second node, and reverse service traffic of the first node is service traffic sent by the second node to the first node.

In embodiments of the present disclosure, it is considered that service traffic of a service is transferred bidirectionally. For example, for a service 1, PE1 may send service traffic corresponding to the service 1 to PE2, and PE2 may also send service traffic corresponding to the service 1 to PE1. In the network scenario shown in FIG. 1B, to facilitate maintenance and management of service traffic, it is generally required that bidirectional service traffic be simultaneously transmitted on a working path or bidirectional service traffic is simultaneously transmitted on a protection path. That is, service traffic sent by PE1 to PE2 is transmitted on the working path, and service traffic sent by PE2 to PE1 is also transmitted on the working path. Alternatively, service traffic sent by PE1 to PE2 is transmitted on the protection path, and service traffic sent by PE2 to PE1 is also transmitted on the protection path.

In view of this, in an optional manner, after the tail node of the path 1 switches traffic to the path 3, the head node of the path 1 may switch a sending path of the service traffic by the head node of the path 1 from the path 4 to the path 1, and send the service traffic through the path 1. It may be understood that an SRv6 packet sent through the path 1 includes a segment list indicating the path 1. Correspondingly, the tail node of the path 1 may switch a receiving path of the service traffic sent by the head node of the path 1 from the path 4 to the path 1, and receive, through the path 4, the service traffic sent by the head node of the path 1. In other words, the tail node of the path 1 may switch a receiving path of the reverse service traffic of the tail node from the path 4 to the path 1, and receive the reverse service traffic through the path 1. The reverse service traffic of the tail node of the path 1 is service traffic sent by the head node of the path 1 to the tail node of the path 1.

It may be understood that the path 1 and the path 3 are co-routed reverse paths of each other, and the path 2 and the path 4 are co-routed reverse paths of each other. According to this solution, after a fault occurs on the path 2, service traffic originally transmitted on the path 2 may be switched to the path 3 for transmission, and service traffic originally transmitted on the path 4 may be switched to the path 1 for transmission, so that bidirectional service traffic is transmitted on the protection path, to facilitate management of service traffic.

Currently, how to transfer a linear protection switching message on a data plane is not defined in SRv6. The present disclosure provides a protection switching method, so that a protection switching message can be transferred on a data plane in an SRv6 network.

The protection switching message in embodiments of the present disclosure may be an automatic protection switching (APS) message, or may be a protection switching coordination (PSC) message. This is not specifically limited in embodiments of the present disclosure. In a method 100 and a method 200 below, an example in which the protection switching message is an APS message is used for description. The APS in the foregoing embodiment may be replaced with a PSC message. For a format of the PSC message, refer to the description part of the request for comments (RFC) 6378 of the Internet Engineering Task Force (IETF), which is not described in detail herein.

Figure 2:
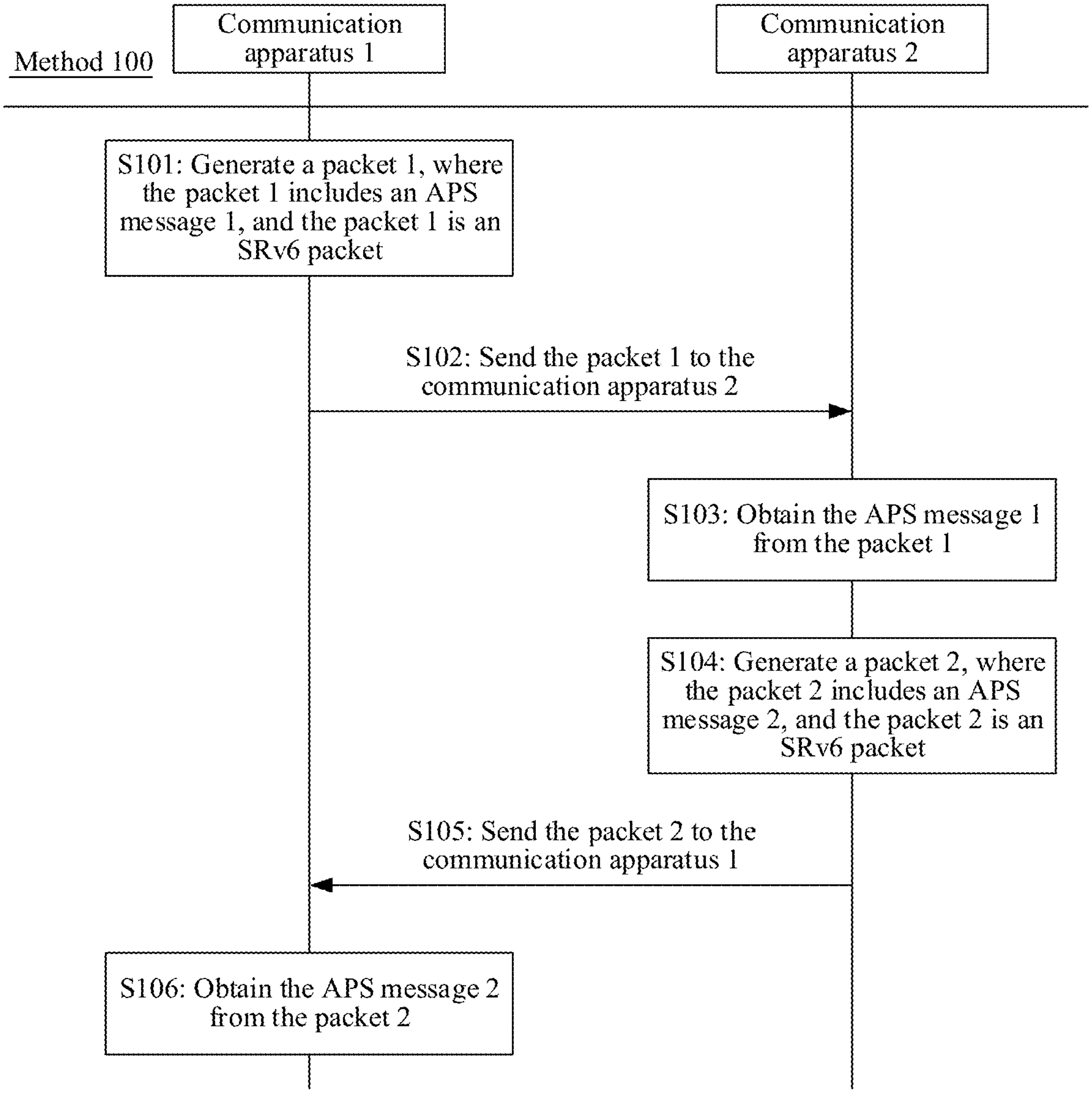
FIG. 2 is a diagram of signaling interaction of a protection switching method according to an embodiment of the present disclosure.

A protection switching method provided in an example of the present disclosure is described below with reference to FIG. 2. FIG. 2 is a diagram of signaling interaction of a protection switching method according to an embodiment of the present disclosure. A communication apparatus 1 in the method 100 shown in FIG. 2 may correspond to the node PE1 shown in FIG. 1B, and a communication apparatus 2 in the method 100 may correspond to the node PE2 shown in FIG. 1B.

The communication apparatus mentioned in embodiments of the present disclosure may be a network device, for example, a switch or a router, or may be some components on a network device, for example, a board or a line card on the network device, or may be a functional module on the network device, or may be a chip configured to implement the method in the present disclosure. This is not specifically limited in embodiments of the present disclosure. Communication apparatuses may be directly connected, for example, by an Ethernet cable or an optical cable.

In embodiments of the present disclosure, that the communication apparatus corresponds to a node refers to that the communication apparatus may be the node, or may be some components on the node. The node in embodiments of the present disclosure may be a network device such as a switch or a router.

In the following description of embodiments of the present disclosure, unless otherwise specified, "traffic" is "service traffic", and "traffic" and "service traffic" may be used alternately.

The method 100 shown in FIG. 2 may include, for example, the following S101 to S106.

Through the following S101 to S103, after a fault occurs on a path 2, a tail node of a path 1 may switch a sending path of forward service traffic of the tail node of the path 1 from the path 2 to a path 3, and send the forward service traffic through the path 3. Correspondingly, a head node of the path 1 may switch a receiving path of the forward service traffic from the path 2 to the path 3, and receive the forward service traffic through the path 3.

Through the following S104 to S106, after the tail node of the path 1 switches traffic to the path 3, the head node of the path 1 may switch a sending path of the service traffic by the head node of the path 1 from a path 4 to the path 1, and send the service traffic through the path 1. Correspondingly, the tail node of the path 1 may switch a receiving path of the service traffic sent by the head node of the path 1 from the path 4 to the path 1, and receive, through the path 4, the service traffic sent by the head node of the path 1. In other words, the tail node of the path 1 may switch a receiving path of the reverse service traffic of the tail node from the path 4 to the path 1, and receive the reverse service traffic through the path 1. The reverse service traffic of the tail node of the path 1 is service traffic sent by the head node of the path 1 to the tail node of the path 1.

The path 1 and the path 3 are co-routed reverse paths of each other, and the path 2 and the path 4 are co-routed reverse paths of each other. After S101 to S106 are performed, after a fault occurs on the path 2, service traffic originally transmitted on the path 2 may be switched to the path 3 for transmission, and service traffic originally transmitted on the path 4 may be switched to the path 1 for transmission, so that bidirectional service traffic is transmitted on a protection path, to facilitate management of service traffic.

S101: A communication apparatus 1 generates a packet 1, where the packet 1 includes an APS message 1, and the packet 1 is an SRv6 packet.

In embodiments of the present disclosure, the packet 1 is a protocol packet, and a transmission path of the packet 1 is the path 1.

In an implementation of embodiments of the present disclosure, the APS message 1 may be carried in a protocol payload of the packet 1.

In another implementation of embodiments of the present disclosure, the APS message 1 may be carried in an IPv6 extension header of the packet 1.

In an example, the extension header of the packet 1 mentioned in embodiments of the present disclosure may be a hop-by-hop (HBH) option header. In other words, the HBH option header of the packet 1 may include the APS message 1. In another example, the extension header of the packet 1 mentioned in embodiments of the present disclosure may be a destination option header (DOH). In other words, the DOH of the packet 1 may include the APS message 1. In still another example, the extension header of the packet 1 mentioned in embodiments of the present disclosure may be a segment routing header (SRH). In other words, the SRH of the packet 1 may include the APS message 1.

In an example, in addition to the APS message 1, the packet 1 may further include indication information 1. The indication information 1 indicates the APS message 1. In an example, the indication information 1 is also carried in the extension header of the packet 1. The extension header that carries the indication information 1 and the extension header that carries the APS message 1 may be the same extension header. For example, both the indication information 1 and the APS message 1 are carried in the SRH. The extension header that carries the indication information 1 and the extension header that carries the APS message 1 may be different extension headers. For example, the indication information 1 is carried in an SRH, and the APS message 1 is carried in a DOH. It may be understood that, if the extension header that carries the indication information 1 and the extension header that carries the APS message 1 are the same extension header, the node that receives the packet 1 may obtain the APS message 1 by parsing one extension header. Therefore, in a solution, the indication information 1 and the APS message 1 are carried in the same extension header. Certainly, the indication information 1 may also be carried in a protocol payload of the packet 1. This is not limited herein.

The communication apparatus 1 may locally maintain an APS state machine. The APS state machine is configured to process an APS message. The communication apparatus 1 may periodically generate a packet including an APS message based on a local state machine, and send the packet including the APS message.

In an example, if no fault occurs on a path that uses a node corresponding to the communication apparatus 2 as a head node and uses a node corresponding to the communication apparatus 1 as a tail node, the APS message 1 may not request the node corresponding to the communication apparatus 2 to perform path switching.

In another example, the communication apparatus 1 may generate the packet 1 after a fault occurs on the path 2. A head node of the path 2 is the node corresponding to the communication apparatus 2, and a tail node of the path 2 is the node corresponding to the communication apparatus 1. In other words, the communication apparatus 1 may generate the packet 1 after a fault occurs on a path on which the tail node of the path 1 is used as a head node and the head node of the path 1 is used as a tail node. In this case, the APS message 1 is used for requesting the tail node of the path 1 to switch a transmission path of traffic from the path 2 to the path 3. The path 2 and the path 3 have a same head node and tail node. The path 3 may be considered as a backup path of the path 2. The path 1 may correspond to PE1-P2-PE2 in FIG. 1B, the path 2 may correspond to PE2-P1-PE1 in FIG. 1B, and the path 3 may correspond to PE2-P2-PE1 in FIG. 1B.

In an implementation of embodiments of the present disclosure, the indication information 1 may be a path identifier 1 that can identify the path 1. The path identifier 1 may be carried in an SRH of the packet 1, or may be carried in an HBH option header or a DOH of the packet 1. This is not limited herein.

It is considered that for an SRv6 packet, a segment list included in an SRH of the SRv6 packet may include a path segment field. The path segment field includes 128 bits, and is used for carrying a path segment identifier, and the path segment identifier is used for identifying an SRv6 path. When the packet 1 includes a path segment field, a value of the path segment field is used for identifying a transmission path of the packet 1. The path segment field may include a locator field and a function field. In an example, the path identifier 1 may be a path segment identifier 1, and the path segment identifier 1 mentioned herein may be used for identifying the path 1. In this case, the path identifier 1 may be carried in the SRH of the packet 1. Similarly, the APS message 1 may also be carried in the SRH of the packet 1. In this case, in an example, if the path segment identifier 1 is used for identifying both the path 1 and the APS message 1, in an example, a locator field of the path segment identifier 1 may be used for indicating the path 1, and a function field of the path segment identifier 1 may be used for indicating the APS message 1. In the following description, an example in which the path identifier 1 is the path segment identifier 1 is used for description.

As described above, the communication apparatus 1 may generate the packet 1 after a fault occurs on the path 2. In this case, the APS message 1 is used for requesting the tail node of the path 1 to switch the transmission path of traffic from the path 2 to the path 3. In this case, the packet 1 may further carry an identifier of a to-be-switched path (that is, the path 2). In this way, the APS message 1 may be used for requesting the tail node of the path 1 to switch the transmission path of traffic from the path 2 to the path 3.

Figure 3A:
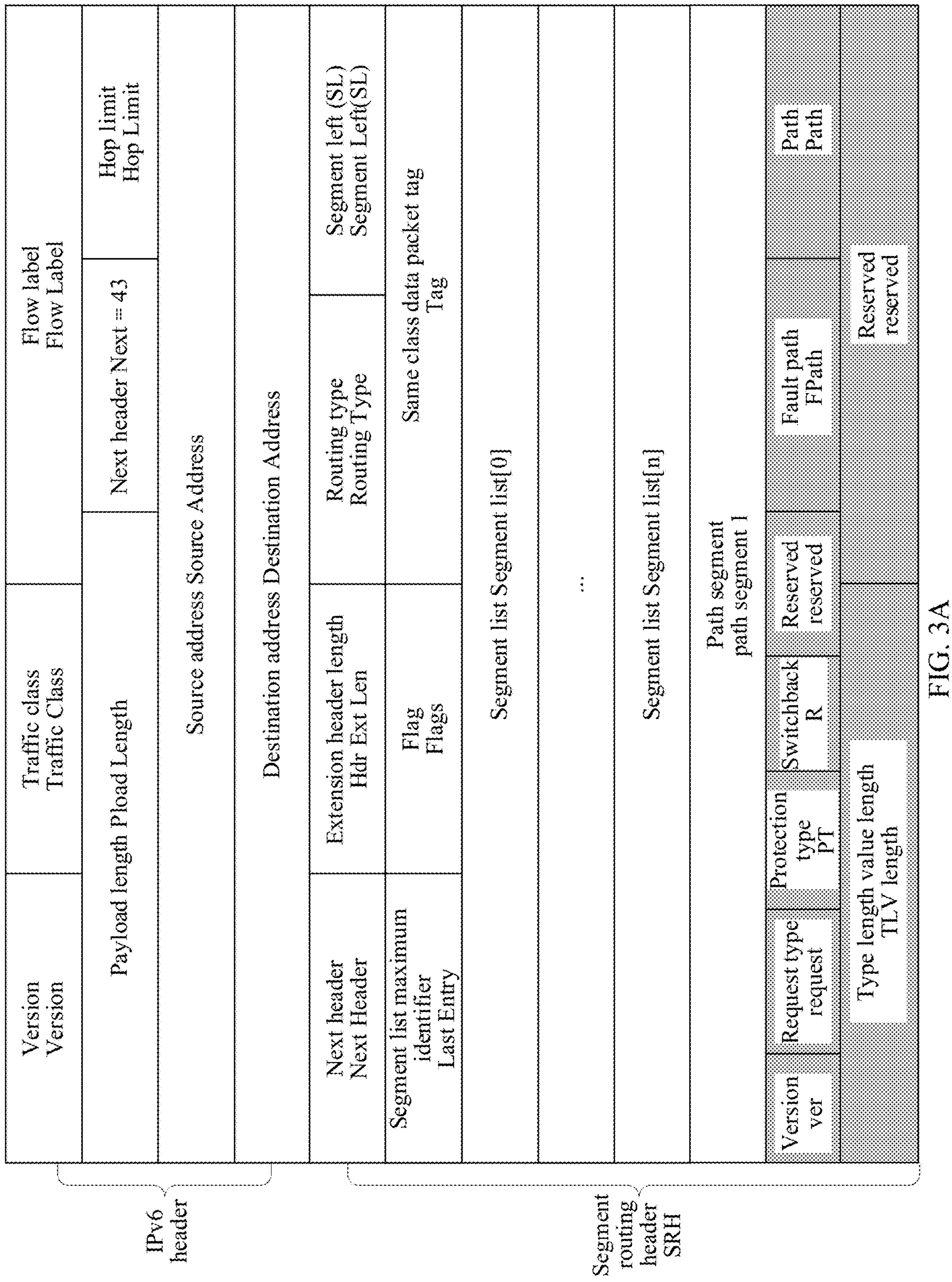
FIG. 3A is a schematic diagram of a structure of a packet 1 according to an embodiment of the present disclosure.

In an implementation, for a 1:1 protection switching scenario or a 1+1 protection switching scenario, the identifier of the path 2 and the identifier of the path 1 may be a same identifier. In this case, the path segment identifier 1 used as the indication information 1 may be further used for identifying the path 2. In this way, in the packet 1, a path segment field may be used for indicating the APS message 1, and may also be used for indicating a to-be-switched path. When processing the APS message 1, the node that receives the packet 1 may determine, based on the path segment field, that the APS message 1 is used for requesting the tail node of the path 1 to switch the transmission path of traffic from the path 2 to the path 3. In this case, for a packet structure of the packet 1, refer to FIG. 3A. FIG. 3A is a schematic diagram of a structure of a packet 1 according to an embodiment of the present disclosure.

In FIG. 3A:

A field path segment 1 is used for carrying the path segment identifier 1.

The APS message 1 may correspond to a shaded part shown in FIG. 3A. For each field in the APS message 1, refer to related descriptions in RFC 7271, and details are not described herein. For other fields in an IPv6 header, refer to related description part in RFC 8200. For other fields in the SRH, refer to related description part in RFC 8754.

It should be noted that FIG. 3A is merely shown as an example, and does not constitute a limitation on embodiments of the present disclosure. In some embodiments, in addition to the fields shown in FIG. 3A, the packet 1 may further include other fields.

It should be noted that for a 1:1 protection switching scenario or a 1+1 protection switching scenario, the path segment identifier 1 may be used for identifying the path 3 and the path 4 in addition to the path 1 and the path 2. The path 4 mentioned herein is a backup path of the path 1. In other words, the path 1 and the path 4 have a same head node and tail node. For example, the path 1 corresponds to PE1-P2-PE2 shown in FIG. 1B, and the path 4 corresponds to PE1-P1-PE2 shown in FIG. 1B.

In some embodiments, it is considered that the path 2 may be used to transmit a plurality of types of service traffic, and different types of service traffic may have different quality of service requirements. To meet quality of service of service traffic having a high quality of service requirement as much as possible, in an example, after the fault occurs on the path 2, a transmission path of the service traffic having a high quality of service requirement may be preferentially switched from the path 2 to the path 3. In this case, the packet 1 may further carry an identifier of at least one service transmitted on the path 2. In this way, the APS message 1 may be used for requesting the tail node of the path 1 to switch a transmission path of the at least one service from the path 2 to the path 3.

In an example, the identifier of the at least one service may be carried by using the path segment identifier 1. For example, the identifier of the at least one service may be carried by using some bits in the path segment identifier 1. In this case, the path segment identifier 1 may be used for indicating the APS message 1, and may also be used for identifying the path 2 and identifying at least one service transmitted on the path 2. The at least one service mentioned herein may be, for example, the foregoing service traffic that has a high requirement for quality of service.

In an implementation, for a node, an identifier of a service carried on the node may correspond to a path segment identifier range. In this case, a path segment identifier corresponding to the node may be used for identifying a path, or may be used for identifying a service transmitted on the path. For example, the identifier of the service 1 corresponds to a path segment identifier range 1, and a path segment identifier a is a segment list in the path segment identifier range 1. In this case, the path segment identifier a may be used for identifying a path, or may be used for identifying the service 1.

In another example, the identifier of the at least one service may be carried in another manner, for example, carried in another field. In an example, for the packet 1 shown in FIG. 3A, a field may be added after the APS message 1 to carry the identifier of the at least one service.

Figure 3B:
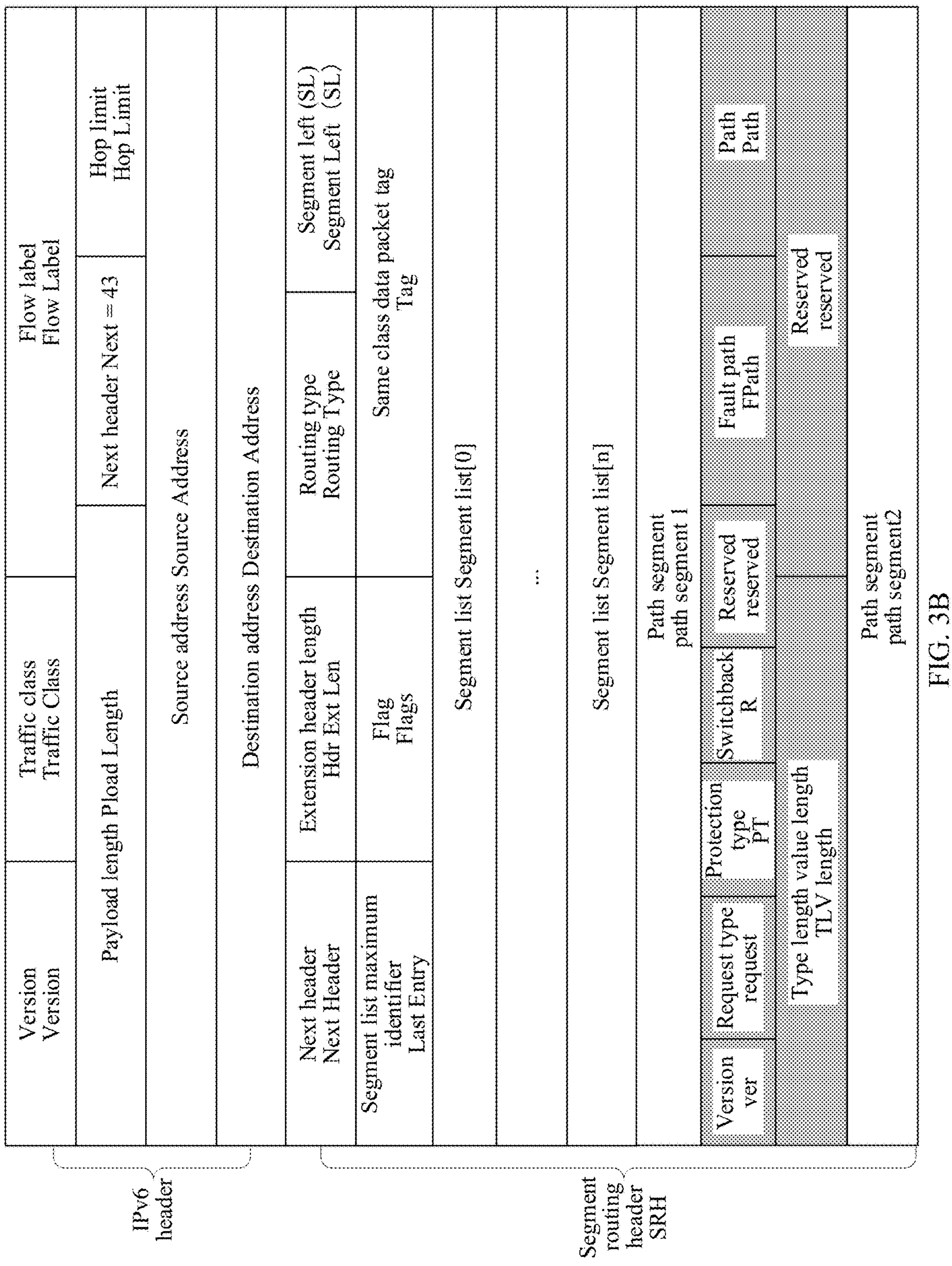
FIG. 3B is a schematic diagram of a structure of a packet 1 according to an embodiment of the present disclosure.

In another implementation, the identifier of the path 2 and the identifier of the path 1 may be different identifiers. In this case, the packet 1 may further include a path identifier 2. In an example, the path identifier 2 may be a path segment identifier 2, and the path segment identifier 2 is used for identifying the path 2. In the following description, an example in which the path identifier 2 is the path segment identifier 2 is used for description. In this case, the node that receives the packet 1 may determine, based on the path segment identifier 2, that the APS message 1 is used for requesting the tail node of the path 1 to switch a transmission path for sending traffic by the tail node from the path 2 to the path 3. In this case, for a packet structure of the packet 1, refer to FIG. 3B. FIG. 3B is a schematic diagram of a structure of a packet 1 according to an embodiment of the present disclosure.

In FIG. 3B:

A field path segment 1 is used for carrying the path segment identifier 1.

A field path segment 2 is used for carrying the path segment identifier 2.

The APS message 1 may correspond to a shaded part shown in FIG. 3B. For each field in the APS message 1, refer to related descriptions in RFC 7271, and details are not described herein. For other fields in an IPv6 header, refer to related description part in RFC 8200. For other fields in the SRH, refer to related description part in RFC 8754.

It should be noted that FIG. 3B is merely shown as an example, and does not constitute a limitation on embodiments of the present disclosure. In some embodiments, in addition to the fields shown in FIG. 3B, the packet 1 may further include other fields.

It should be noted that for a 1:1 protection switching scenario or a 1+1 protection switching scenario, the path segment identifier 1 may be used for identifying the path 4 in addition to the path 1. The path 4 mentioned herein is a backup path of the path 1. In other words, the path 1 and the path 4 have a same head node and tail node. For example, the path 1 corresponds to PE1-P2-PE2 shown in FIG. 1B, and the path 4 corresponds to PE1-P1-PE2 shown in FIG. 1B. The path segment identifier 2 may be used for identifying the path 3 in addition to the path 2. Certainly, the path segment identifier of the path 4 may be different from the path segment identifier of the path 1, and the path segment identifier of the path 3 may be different from the path segment identifier of the path 2. This is not specifically limited in embodiments of the present disclosure. In the 1:n protection switching scenario, a path segment identifier is in a one-to-one correspondence with a path identified by the path segment identifier.

As described above, it is considered that the path 2 may be used to transmit a plurality of types of service traffic, and different types of service traffic may have different quality of service requirements. To meet quality of service of service traffic having a high quality of service requirement as much as possible, in an example, after the fault occurs on the path 2, a transmission path of the service traffic having a high quality of service requirement may be preferentially switched from the path 2 to the path 3. In this case, the packet 1 may further carry an identifier of at least one service transmitted on the path 2. In this way, the APS message 1 may be used for requesting the tail node of the path 1 to switch a transmission path of the at least one service from the path 2 to the path 3.

In an example, the identifier of the at least one service may be carried by using the path segment identifier 2. For example, the identifier of the at least one service may be carried by using some bits in the path segment identifier 2. In this case, the path segment identifier 2 may be used for identifying the path 2, and may also be used for identifying at least one service transmitted on the path 2. The at least one service mentioned herein may be, for example, the foregoing service traffic that has a high requirement for quality of service.

In another example, the identifier of the at least one service may be carried in another manner, for example, carried in another field. In an example, for the packet 1 shown in FIG. 3B, a field may be added after the APS message 1, for example, after the field path segment 2, to carry the identifier of the at least one service.

In another implementation of embodiments of the present disclosure, the indication information 1 may be other information other than the path segment identifier 1. In an example, an extension header of the packet 1 may include a TLV field 1, and the TLV field 1 is used for carrying the indication information 1 and the APS message 1.

In an example, the TLV field 1 is used for carrying the indication information 1 and the APS message 1.

In another example, in addition to the indication information 1 and the APS message 1, the TLV field 1 may be further used for carrying other information. In this case, the TLV field 1 may be an associated channel TLV, and the associated channel TLV includes a field that carries indication information 1 and a field that carries the APS message 1. In an example, the associated channel TLV includes a channel type field, where the channel type field is used for carrying the indication information 1, and a value field of the associated channel TLV field is used for carrying the APS message 1.

It should be noted that, in an example, the packet 1 may include an associated channel. The associated channel can carry different types of control channels. One of the control channels is an APS channel, and the APS channel is used for carrying the indication information 1 and the APS message 1. In an example, the TLV field 1 is an associated channel TLV, and the associated channel is carried in the associated channel TLV For the associated channel, it should be noted that:

An associated channel can provide a control channel. In the present disclosure, different types of control channels can be provided through one associated channel. In other words, different types of control channels are carried through the associated channel provided in the present disclosure. An associated channel may carry one or more control channels as required. Each type of control channel can carry at least one type of control management message.

The control channel is used for carrying a control management message, and one control channel may be used for carrying at least one control management message.

A control management message is a message that can control and/or manage a path such as a tunnel. A format of the control management message and specific content included in the control management message are not specifically limited in embodiments of the present disclosure, provided that the control management message can implement a corresponding control and/or management function. In an example, a control management message may be used for implementing a control function or a management function.

In the present disclosure, when the TLV field 1 is an associated channel TLV, the control channel carried by the associated channel includes an APS channel, where the APS channel is used for carrying the indication information 1 and the APS message 1.

In an example, if the packet 1 includes an associated channel, the packet 1 further includes indication information 2 used for indicating the associated channel. The node that receives packet 1 may determine, based on the indication information 2, that the packet 1 includes the associated channel. In an example, the indication information 2 may be carried in the associated channel TLV For example, the indication information 2 may be carried in a type field of the associated channel TLV In another example, the indication information 2 may be carried by using a field that is not defined in the extension header of the packet 1. For example, the indication information 2 may be carried by using a flags field in an SRH of the packet 1.

Figure 3C:
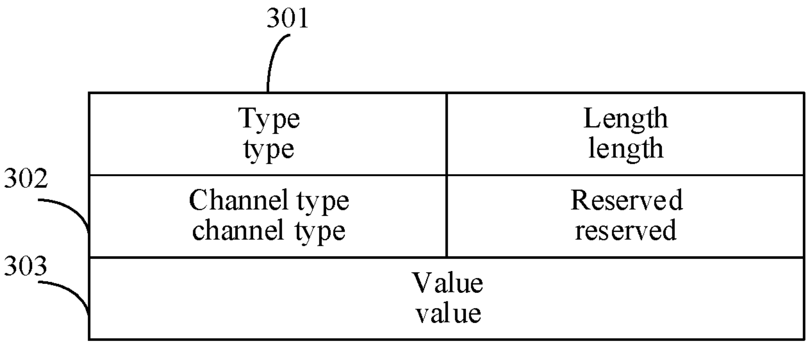
FIG. 3C is a schematic diagram of a structure of an associated channel TLV according to an embodiment of the present disclosure.
Figure 3D:
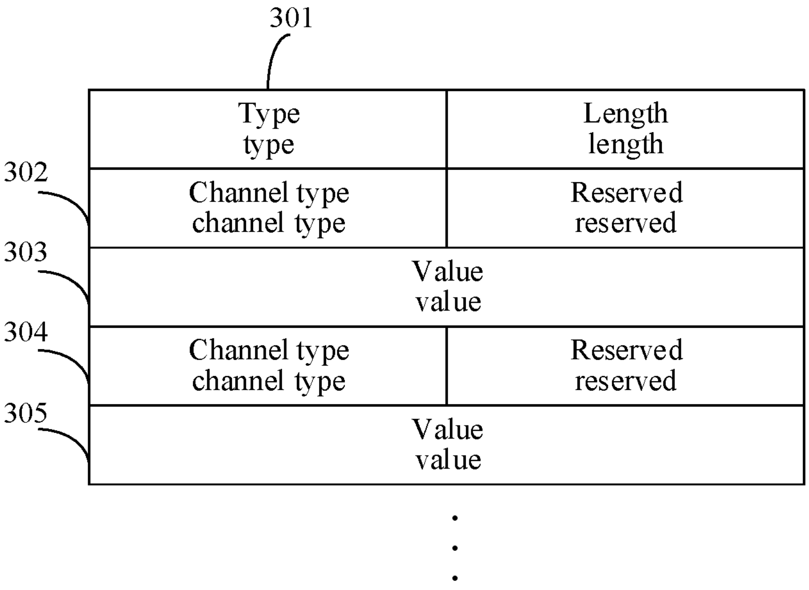
FIG. 3D is a schematic diagram of a structure of an associated channel TLV according to an embodiment of the present disclosure.

For the associated channel TLV, refer to FIG. 3C and FIG. 3D for understanding. FIG. 3C and FIG. 3D each are a schematic diagram of a structure of an associated channel TLV according to an embodiment of the present disclosure.

FIG. 3C shows a structure of an associated channel TLV when an associated channel carries one type of control channel, and FIG. 3D shows a structure of an associated channel TLV field when an associated channel carries a plurality of types of control channels.

In FIG. 3C and FIG. 3D:

A type field 301 is used for carrying the indication information 2.

A channel type field 302 and a channel type field 304 are used for carrying a channel type. In an example, the channel type field 302 or the channel type field 304 is used for carrying the indication information 1.

A reserved (reserved) field is a reserved field for future extension of the associated channel TLV, and the reserved field is an optional field.

A value field 303 is used for carrying at least one control management message carried by the channel type indicated by the channel type field 302. In an example, if the channel type field 302 carries the indication information 1, the value field 303 is used for carrying the APS message 1. In another example, the value field 303 may include at least one sub (sub) TLV, and one sub-TLV is used for carrying one control management message. A length of the value field 303 may be determined based on the control management message carried in the value field 303, or may be a fixed length. This is not limited herein.

A value field 305 is used for carrying at least one control management message carried by the channel type field 304. In an example, if the channel type field 304 carries the indication information 1, the value field 305 is used for carrying the APS message 1. In another example, the value field 305 may include at least one sub-TLV, and one sub-TLV is used for carrying one control management message. A length of the value field 305 may be determined based on the control management message carried in the value field 305, or may be a fixed length. This is not limited herein.

Figure 3E:
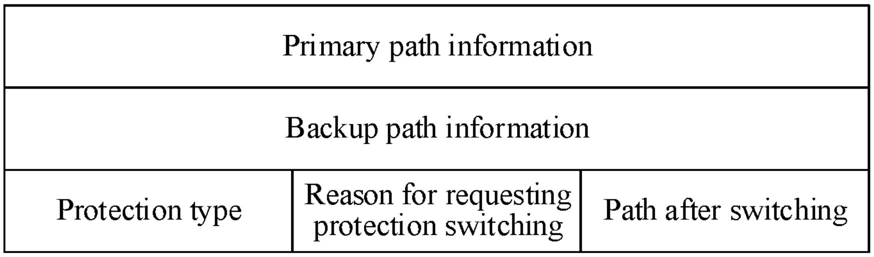
FIG. 3E is a schematic diagram of a structure of another APS message according to an embodiment of the present disclosure.

It should be noted that, the structure of the APS message carried in the associated channel TLV in embodiments of the present disclosure may be the structure of the APS message mentioned in RFC 7271. Alternatively, the structure may be another structure. For example, FIG. 3E is a schematic diagram of a structure of another APS message according to an embodiment of the present disclosure. In an example, the APS message shown in FIG. 3E may be carried in the value field 303 shown in FIG. 3C or the value field 305 shown in FIG. 3D.

A primary path information field is used for carrying information about a primary path, for example, carrying an identifier of a primary path.

A backup path information field is used for carrying information about a backup path, for example, carrying an identifier of a backup path.

A protection type field (protection type) indicates a protection protocol type, where a plurality of flag bits may be defined for a protection type to identify a protection protocol type, for example, 1+1 protection or 1:1 protection, support of bidirectional switching or unidirectional switching, whether to delay switchback, and delay switchback time.

A reason field for requesting protection switching is used for indicating a reason why the tail node of the request packet 1 performs path switching.

The path field after switching indicates a path after switching based on indication information. The tail node of the packet 1 may switch, based on information path after switching, service traffic to the path after switching. The path field after switching may include a plurality of indication bits, for example, including an indication bit of a primary path and an indication bit of a backup path. When a value of the indication bit of the primary path is a preset value (for example, 1), it indicates that the path after switching is a primary path. When a value of the indication bit of the backup path is the preset value, it indicates that the path after switching is a backup path. For example, after a fault occurs the path PE2-P1-PE1, the packet 1 sent by PE1 to PE2 through the path PE1-P2-PE2 includes the APS message shown in FIG. 3E. In this case, the path after switching indicated by the path field after switching in the APS message may be, for example, the path PE2-P2-PE1.

S102: The communication apparatus 1 sends the packet 1 to a communication apparatus 2.

After generating the packet 1, the communication apparatus 1 may send the packet 1 to the communication apparatus 2. Corresponding to the scenario shown in FIG. 1B, the communication apparatus 1 may send the packet 1 to the communication apparatus 2 through the intermediate node P2.

S103: The communication apparatus 2 obtains the APS message 1 from the packet 1.

After receiving the packet 1, the communication apparatus 2 parses the packet 1, and determines, based on the indication information 1, that the packet 1 includes the APS message 1, to obtain the APS message 1. In an example, after receiving the APS message 1, the communication apparatus 2 may perform a corresponding operation based on the APS message 1.

In an example, if the APS message 1 is not used for requesting the communication apparatus 2 to perform path switching, the communication apparatus 2 may discard, for example, the packet 1.

In another example, after the communication apparatus 2 receives the packet 1, if the APS message 1 indicates the tail node of the path 1 to switch the transmission path of traffic from the path 2 to the path 3, the communication apparatus 2 may perform a corresponding processing measure based on a locally maintained APS state machine. In an example, the communication apparatus 2 may switch the transmission path of traffic from the path 2 to the path 3.

In an implementation, if a structure of the packet 1 received by the communication apparatus 2 is shown in FIG. 3A or FIG. 3B, the communication apparatus 2 may locally store a correspondence shown in the following Table 1. In Table 1, a path segment a is a path segment identifier of the path 2, a segment list 2 is a segment list corresponding to the path 2, and a segment list 3 is a segment list corresponding to the path 3.

TABLE 1

| Path segment identifier | Segment list 1 | Segment list 2 |
|---|---|---|
| path segment a | segment list 2 | segment list 3 |

After receiving the packet 1, the communication apparatus 2 searches for a correspondence shown in Table 1 based on the path segment a (for example, the field path segment 1 shown in FIG. 3A or the field path segment 2 shown in FIG. 3B) carried in the packet 1. The communication apparatus 1 determines a path fault indicated by the segment list 2. Therefore, the communication apparatus 2 may determine a segment list for guiding packet forwarding as the segment list 3. For example, the segment list for guiding packet forwarding is changed from the segment list 2 to the segment list 3, so that the transmission path of traffic is switched from the path 2 to the path 3. Table 1 described above does not indicate that the communication apparatus 2 needs to locally store the foregoing correspondence in a form of a table. The foregoing correspondence is presented in a form of a table in the application document, which is more intuitive.

In another implementation, if a structure of the APS message in the packet 1 received by the communication apparatus 2 is shown in FIG. 3E, the communication apparatus 1 may determine, based on the path field after switching in the APS message, the segment list corresponding to the path after switching indicated by the path field after switching. It is assumed that before the packet 1 is received, the segment list for guiding packet forwarding is the segment list 2, and the segment list corresponding to the path after switching is the segment list 3. The communication apparatus 2 may change the segment list for guiding packet forwarding from the segment list 2 to the segment list 3, to switch the transmission path of traffic from the path 2 to the path 3.

It should be noted that, if the APS message 1 in the packet 1 is used for requesting the tail node of the path 1 to switch the transmission path of the at least one service transmitted on the path 2 from the path 2 to the path 3, when switching the transmission path of traffic, the communication apparatus 2 may switch the transmission path of the at least one service from the path 2 to the path 3, and traffic of another service may not be switched temporarily.

Through the foregoing S101 to S103, the tail node of the path 1 may switch the transmission path of traffic from the path 2 to the path 3. In this process, the intermediate node on the path 2 does not need to calculate the backup path. The head node of the path 2 locally stores the segment list of the backup path. It can be learned that, through this solution, a requirement on a data processing capability of an intermediate node on a to-be-switched path, that is, the path 2, can be reduced, to reduce deployment costs of an SRv6 network.

To enable bidirectional service traffic to be transmitted on the working path or bidirectional service traffic to be transmitted on the protection path, in a possible implementation, in addition to S101 to S103, the method 100 may further include S104 to S106. Through S104 to S106, after the tail node of the path 1 switches the transmission path of traffic from the path 2 to the path 3, the head node of the path 1 can also switch the transmission path of traffic from the path 4 to the path 1.

S104: The communication apparatus 2 generates a packet 2, where the packet 2 includes an APS message 2, and the packet 2 is an SRv6 packet.

In an implementation, the packet 2 is also a protocol packet. The APS message 2 is similar to the APS message 1, and is a request type message. In this case, a structure of the APS message 2 may be shown in FIG. 3A, FIG. 3B, or FIG. 3E. The APS message 2 is used for requesting the tail node of the path 1 to switch a transmission path of traffic from the path 4 to the path 1. The path 4 is a co-routed reverse path of the path 2, and the path 1 is a co-routed reverse path of the path 3. Before a fault occurs on the path 2, the head node of the path 1 sends the service traffic to the tail node of the path 1 through the path 4, and the tail node of the path 1 sends the service traffic to the head node of the path 1 through the path 2.

When the structure of the APS message 2 is shown in FIG. 3A, the field path segment 1 shown in FIG. 3A is used for carrying a path segment identifier 3. The path segment identifier 3 can identify the path 3, and may also be used for identifying the path 4. In some examples, the path segment identifier 3 may be further used for identifying that at least one service is transmitted on the path 4. When a same path segment identifier is used for the path 1, the path 2, the path 3, and the path 4, the path segment identifier 3 may be the same as the path segment identifier 1 mentioned above. The path 3 is a transmission path of the packet 2.

When the structure of the APS message 2 is shown in FIG. 3B, the field path segment 1 shown in FIG. 3B is used for carrying the path segment identifier 3, the path segment identifier 3 can identify the path 3, and the path 3 is the transmission path of the packet 2. The field path segment 2 shown in FIG. 3B is used for carrying a path segment identifier 4. The path segment identifier 4 is used for identifying the path 4. In some examples, the path segment identifier 4 may be further used for identifying that at least one service is transmitted on the path 4. When a same path segment identifier is used for the path 1 and the path 4, the path segment identifier 4 may be the same as the path segment identifier 1 mentioned above. When a same path segment identifier is used for the path 2 and the path 3, the path segment identifier 3 may be the same as the foregoing path segment identifier 2.

When the structure of the APS message 2 is shown in FIG. 3E, a path indicated by the path field after switching shown in FIG. 3E is the path 1.

In another implementation, the APS message 2 may be a response message of the APS message 1. In this case, in an example, the structure of the APS message 2 may be shown in FIG. 3A. In this case, a request type field of the APS message 2 may indicate, for example, that the APS message 2 is a response message. In an example, values of fields other than the request type field in the APS message 2 may be, for example, default values, or may be the same as the value of the corresponding field in the APS message 1, to indicate that the APS message 2 is a response message of the APS message 1.

S105: The communication apparatus 2 sends the packet 2 to the communication apparatus 1.

After generating the packet 2, the communication apparatus 2 may send the packet 2 to the communication apparatus 1 through the path 3.

S106: The communication apparatus 1 obtains the APS message 2 from the packet 2.

After receiving the packet 2, the communication apparatus 1 may parse the packet 2 to obtain the APS message 2. Further, the communication apparatus 1 may perform a corresponding operation based on the APS message 2.

After the communication apparatus 1 receives the packet 2, if the APS message 2 indicates the head node of the path 1 to switch the transmission path of traffic from the path 4 to the path 1, the communication apparatus 1 may perform a corresponding processing measure based on a locally maintained APS state machine. In an example, the communication apparatus 1 may switch the transmission path of traffic from the path 4 to the path 1.

In an implementation, if a structure of the packet 2 received by the communication apparatus 1 is shown in FIG. 3A or FIG. 3B, the communication apparatus 1 may locally store a correspondence shown in the following Table 2. In Table 2, a path segment b is a path segment identifier of the path 4, a segment list 4 is a segment list corresponding to the path 4, and a segment list 1 is a segment list corresponding to the path 1.

TABLE 2

| Path segment identifier | Segment list 1 | Segment list 2 |
|---|---|---|
| path segment b | segment list 4 | segment list 1 |

After receiving the packet 2, the communication apparatus 1 searches for a correspondence shown in Table 2 based on the path segment b (for example, the field path segment 1 shown in FIG. 3A or the field path segment 2 shown in FIG. 3B) carried in the packet 2, and may determine a segment list for guiding packet forwarding as the segment list 1. For example, the segment list for guiding packet forwarding is changed from the segment list 4 to the segment list 1, so that the transmission path of traffic is switched from the path 4 to the path 1.

In another implementation, if a structure of the APS message in the packet 2 received by the communication apparatus 1 is shown in FIG. 3E, the communication apparatus 2 may determine, based on the path field after switching in the APS message, the segment list corresponding to the path after switching indicated by the path field after switching. It is assumed that before the packet 2 is received, the segment list for guiding packet forwarding is the segment list 4, and the segment list corresponding to the path after switching is the segment list 1. The communication apparatus 1 may determine the segment list for guiding packet forwarding as the segment list 1, to switch the transmission path of traffic from the path 4 to the path 1.

In an example, when switching the transmission path of traffic, the communication apparatus 1 may switch the transmission path of the at least one service from the path 4 to the path 1, and traffic of another service may not be switched temporarily.

As described above, the associated channel can provide a control channel. Different types of control channels can be provided through one associated channel, and one type of control channel is an APS channel. Regarding other types of control channels that can be provided by the associated channel, it should be noted that:

The at least one control channel carried by a management channel may further include, for example, one or more of an operation administration maintenance (OAM) channel, a fault indication channel, a resource management channel, a signaling communication channel (SCC), and a management communication channel (MCC).

The control management message carried by the OAM channel may be an OAM message, where the OAM message is a general term of a series of messages for implementing operation, maintenance, and management on an end-to-end SRv6 path. The OAM message includes, but not limited to, a connectivity detection message, a client signal fault indication message, a unidirectional/bidirectional packet loss measurement message, a unidirectional/bidirectional delay measurement message, and a link loopback message. The connectivity detection message is used for implementing connectivity detection on an IPv6 path. The client signal fault indication message is used for detecting whether a client signal fault exists on the IPv6 path. The unidirectional/bidirectional packet loss measurement message is used for detecting unidirectional/bidirectional packet loss on the SRv6 path. The unidirectional/bidirectional delay measurement message is used for detecting unidirectional/bidirectional delay on the IPv6 path. The link loopback message is used for implementing loopback detection on the IPv6 path. In an example, when the OAM message is a connectivity detection message, the OAM channel corresponds to a connectivity detection channel.

A format of the OAM message is not limited in embodiments of the present disclosure, provided that the message can implement a corresponding OAM detection function.

For example, the control management message carried by the fault indication channel may be a fault indication message. The control management message carried by the fault indication channel is used for recording fault indication information of a path. When the packet 1 includes the fault indication channel, the control management message carried by the fault indication channel is used for recording fault indication information of the path 1.

In an example, the fault indication message may include one or more types of fault indication information, for example, may include forward fault indication information and/or backward fault indication information. The forward fault indication information indicates that a fault occurs on an upstream node of a communication apparatus on a transmission path of the packet 1, for example, indicates that a fault occurs on an intermediate node on the transmission path of the packet 1. That a fault occurs on the upstream node mentioned herein may be, for example, that a bit error ratio of the upstream node is greater than a particular threshold, or a packet loss ratio of the upstream node is greater than a particular threshold, which is not limited herein. The backward fault indication information indicates that a fault occurs on a downstream node of a communication apparatus on a transmission path of the packet 1, for example, indicates that a fault occurs on a tail node on the transmission path of the packet 1. Similarly, that a fault occurs on the downstream node mentioned herein may be, for example, that a bit error ratio of the downstream node is greater than a particular threshold, or a packet loss ratio of the downstream node is greater than a particular threshold, which is not limited herein. In another example, the fault indication information may reflect, for example, a fault state of the path 1. For example, the fault indication information includes one or more of a signal fault (SF), signal degrade (SD), a bit error ratio being greater than a threshold, a packet loss ratio being greater than a threshold, and a delay being greater than a threshold. In this case, the control management message carried by the fault indication channel may include, for example, indication bits corresponding to various types of fault indication information. In another implementation, the fault indication information may be, for example, information such as a bit error ratio and a packet loss ratio of a node on the path 1. In this case, the control management message carried by the fault indication channel may include, for example, a specific value of the bit error ratio and/or a specific value of the packet loss ratio. Optionally, the fault indication message may further include an identifier of the path 1.

A structure of the fault indication message is not specifically limited in embodiments of the present disclosure.

In an example, when the channel type field in the associated channel indicates a fault indication channel, the value field of the TLV field that carries the associated channel includes a fault indication message. For example, in FIG. 3C, the channel type field 302 indicates a fault indication channel, and the value field 303 is used for carrying a fault indication message. In another example, in FIG. 3D, the channel type field 304 indicates a fault indication channel, and the value field 305 is used for carrying a fault indication message.

In another example, the fault indication message is carried in a TLV field. The TLV field mentioned herein may be carried in a value field 303 of the TLV field shown in FIG. 3C, or may be carried in a value field 303 or 305 of the TLV field shown in FIG. 3D.

In addition, in another example, the fault indication message may include a plurality of types of messages, for example, may include a link status indication message and a link parameter indication message. The link status indication message may include one or more types of fault indication information such as an SF, SD, a bit error ratio being greater than a particular threshold, a packet loss ratio being greater than a particular threshold, and a delay being greater than a particular threshold. The link parameter indication message may include information such as a bit error ratio and a packet loss ratio.

The control management message carried by the resource management channel is used for implementing resource management on a path. In this case, when the packet 1 includes the resource management channel, the control management message carried by the resource management channel is used for implementing resource management on the path 1.

The control management message carried by the resource management channel may be, for example, a resource management message. The resource management message may include a plurality of types of messages. In an example, the resource management message may include a resource reservation request message, used for indicating the node on the path 1 to reserve a resource. For example, the resource reservation request message may carry SLA information such as a bandwidth and a delay. In another example, the resource management message may include a resource status update message, used for collecting an available resource of the node on the path 1, for example, collecting resource information such as bandwidth, a buffer, and a delay that can be provided by the node on the path 1. In another example, the resource management message may include a resource reservation cancellation message, used for canceling a resource reservation request.

It should be noted that, the resource management message in embodiments of the present disclosure may be, for example, a resource reservation protocol (RSVP) message, for example, an RSVP message mentioned in RFC 3209, or may be a message obtained after the RSVP message mentioned in RFC 3209 is correspondingly extended. This is not specifically limited in embodiments of the present disclosure.

The SCC is configured to provide a separate channel between two nodes of an SRv6 path to transfer an SCC message, where the SCC message is used for transferring control information.

The MCC is used for providing a separate channel between two nodes of an SRv6 path to transfer an MCC message, where the MCC message is used for transferring management information.

With regard to the MCC and the SCC, it should be noted that, in a conventional SRv6 network, there is no separate channel between any two nodes to transfer management information, and there is no separate channel between any two nodes to transfer control information. Therefore, a separate control management mechanism is required to transfer a management message and a control message. The MCC implements transfer of a management message without using a separate control management mechanism, and the SCC implements transfer of a control message without using a separate control management mechanism.

Specific formats of the SCC message and the MCC message are not specifically limited in embodiments of the present disclosure. In an example, for formats of the SCC message and the MCC message, refer to related descriptions in RFC 5718.

That an associated channel is used to carry different types of control channels has the following advantages:

1. An associated channel is used for carrying control management messages of a plurality of protocols. One packet may carry a plurality of TLV fields to reduce a quantity of control management information packets transferred between nodes.
2. An associated channel may be carried by a common TLV field. TLV encapsulation is performed in an IPv6 extension header, and other network layers such as a UDP layer is removed. The encapsulation and transfer of control management messages are unified and simplified, to reduce device maintenance parameters such as a UDP port number entry.

3. A TLV format with a value of a variable length can be extended to transfer a control management message, and more channel maintenance information can be carried.
4. An IPv6 packet header is used for message transfer, so that packet header content may be processed in a fast path on a device forwarding plane, to improve message processing efficiency.
5. An associated channel may be carried in a plurality of IPv6 extension headers, for example, in an HBH option header or a DOH. Therefore, the associated channel is applicable to both SRv6 nodes and IPv6 nodes that do not support SR.

In addition, an existing IP layer protocol does not support an MCC and an SCC. In addition, although ICMPv6 can indicate diagnosis information such as path connectivity and reachability, ICMPv6 cannot indicate fault information of a node or a network. A BFD diagnosis word may indicate a reason why a state of a BFD session of the node changes last time, that is, indicate a change of a protocol state of a BFD protocol control plane, and cannot indicate fault information of the node or the network. The foregoing associated channel can support functions such as an MCC, an SCC, and indicating fault information of the node or the network. When the node needs to support a new upper-layer protocol, the associated channel may carry control management information required by the upper-layer protocol without redesigning a new upper-layer protocol. The protocol has good scalability, and a quantity of node protocols and the maintenance complexity are reduced.

In addition, in a scenario in which a plurality of types of networks are converged, the associated channel includes a plurality of types of control management messages in an IP extension header, which simplifies a protocol stack without adding protocols of other layers, reduces implementation complexity of nodes, and improves deployability in industrial scenarios.

For a MPLS network to which SR is applied, a fast re-route mechanism is usually also used to implement protection against a fault on a link or node. Therefore, the foregoing mentioned intermediate node also needs to maintain a large amount of path state information and path configuration information, and it cannot be ensured that forward and reverse paths of forward and reverse services pass through a same intermediate node and a same link set.

If a fault occurs on a first path in an MPLS network, service traffic originally transmitted through the first path cannot be normally transmitted, and quality of service is affected. A current path switching manner in the MPLS network is similar to a path switching manner in an SRv6 network, that is, if a fault occurs on the first path, each intermediate node on the first path needs to participate in calculation of a backup path, and locally maintains a large amount of path state information and path configuration information, to switch service traffic originally transmitted on the first path to the backup path for forwarding. This manner requires that the intermediate node has a high data processing capability. Therefore, if the protection switching of the first path is implemented in this manner, deployment costs of the MPLS network are high.

In view of this, an embodiment of the present disclosure provides a protection switching method. Protection switching can be performed on an end-to-end MPLS path without requiring that an intermediate node have a high data processing capability. A typical network architecture of an MPLS network to which SR is applied may be shown in FIG. 1B. In other words, in another example, the network 100 shown in FIG. 1B may be an MPLS network to which SR is applied. In this case, PE1, P1, P2, and PE2 are all nodes in the MPLS network. The network architecture shown in FIG. 1B is not described herein again.

In an example, the path PE1-P2-PE2 shown in FIG. 1B is referred to as a path 1, the path PE2-P1-PE1 is referred to as a path 2, the path PE2-P2-PE1 is referred to as a path 3, and the path PE1-P1-PE2 is referred to as a path 4. An example is as follows:

After a fault occurs on the path 2, a tail node of the path 1 may switch a sending path of forward service traffic of the tail node of the path 1 from the path 2 to the path 3, and send the forward service traffic through the path 3. An SRv6 packet sent through the path 3 includes an MPLS label list indicating the path 3. Correspondingly, a head node of the path 1 may switch a receiving path of the forward service traffic from the path 2 to the path 3, and receive the forward service traffic through the path 3. For ease of description, the tail node of the path 1 is referred to as a first node, and the head node of the path 1 is referred to as a second node. In this case, forward service traffic of the first node is service traffic sent by the first node to the second node, and reverse service traffic of the first node is service traffic sent by the second node to the first node.

In addition, to ensure that forward and reverse paths of forward and reverse services pass through a same intermediate node and a same link set, in an optional manner, after the tail node of the path 1 switches traffic to the path 3, the head node of the path 1 may switch a sending path of the service traffic by the head node of the path 1 from the path 4 to the path 1, and send the service traffic through the path 1. It may be understood that an MPLS packet sent through the path 1 includes an MPLS label list indicating the path 1. Correspondingly, the tail node of the path 1 may switch a receiving path of the service traffic sent by the head node of the path 1 from the path 4 to the path 1, and receive, through the path 4, the service traffic sent by the head node of the path 1. In other words, the tail node of the path 1 may switch a receiving path of the reverse service traffic of the tail node from the path 4 to the path 1, and receive the reverse service traffic through the path 1. The reverse service traffic of the tail node of the path 1 is service traffic sent by the head node of the path 1 to the tail node of the path 1.

It may be understood that the path 1 and the path 3 are co-routed reverse paths of each other, and the path 2 and the path 4 are co-routed reverse paths of each other. According to this solution, after a fault occurs on the path 2, service traffic originally transmitted on the path 2 may be switched to the path 3 for transmission, and service traffic originally transmitted on the path 4 may be switched to the path 1 for transmission, so that bidirectional service traffic is transmitted on the protection path, to facilitate management of service traffic.

Currently, how to transfer a linear protection switching message on a data plane is not defined in MPLS. The present disclosure provides a protection switching method, so that a protection switching message can be transferred on a data plane in an MPLS network.

Figure 4:
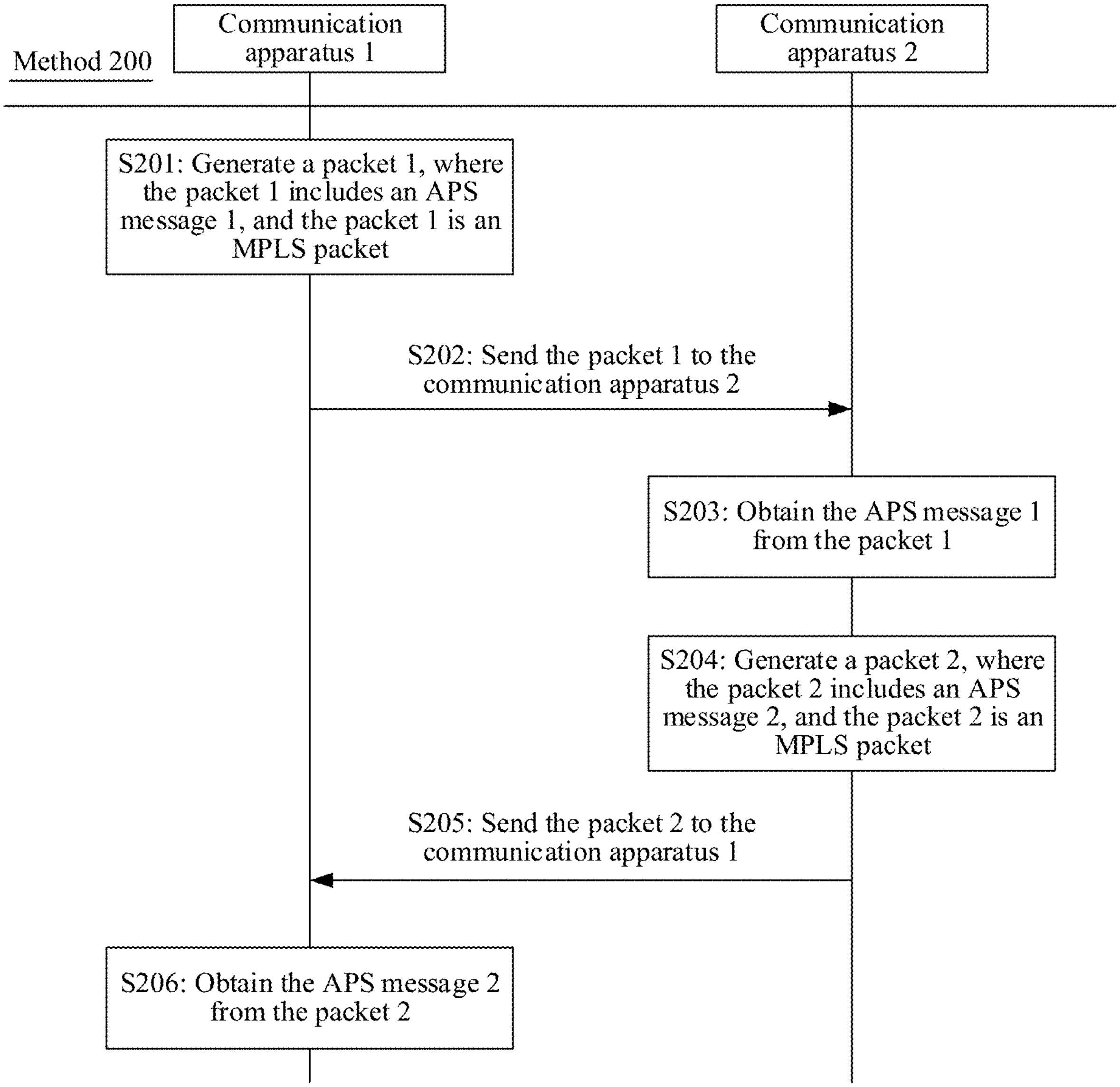
FIG. 4 is a diagram of signaling interaction of a protection switching method according to an embodiment of the present disclosure.

FIG. 4 is a diagram of signaling interaction of a protection switching method according to an embodiment of the present disclosure. The method 200 shown in FIG. 4 may include, for example, the following S201 to S206.

S201: A communication apparatus 1 generates a packet 1, where the packet 1 includes an APS message 1, and the packet 1 is an MPLS packet.

In embodiments of the present disclosure, the packet 1 is a protocol packet, and the APS message 1 may be carried in a protocol payload of the packet 1.

In an example, in addition to the APS message 1, the packet 1 may further include indication information 1. The indication information 1 indicates the APS message 1. In an example, the indication information 1 is carried in a label stack of the packet 1.

In an implementation, the indication information 1 may be a path identifier 1, and the path identifier 1 is used for identifying the path 1.

In an implementation, it is considered that for an MPLS packet, in addition to an MPLS label (label) that guides packet forwarding, a label stack of the MPLS packet may further include a path segment (path segment) field. A value of the path segment field is used for identifying an MPLS path. When the packet 1 includes a path segment field, a value of the path segment field is used for identifying a transmission path of the packet 1, for example, may be used for identifying an MPLS label list used to guide forwarding of the packet 1. In an example, the path identifier 1 may be a path segment identifier 1, and the path segment identifier 1 mentioned herein may be used for identifying the path 1. In the following description, an example in which the path identifier 1 is the path segment identifier 1 is used for description.

The communication apparatus 1 may locally maintain an APS state machine. The APS state machine is configured to process an APS message. The communication apparatus 1 may periodically generate a packet including an APS message based on a local state machine, and send the packet including the APS message.

In embodiments of the present disclosure, a transmission path of the packet 1 is the path 1.

In an example, if no fault occurs on a path that uses a node corresponding to the communication apparatus 2 as a head node and uses a node corresponding to the communication apparatus 1 as a tail node, the APS message 1 may not request the node corresponding to the communication apparatus 2 to perform path switching.

In still example, the communication apparatus 1 may generate the packet 1 after a fault occurs on the path 2. A head node of the path 2 is the node corresponding to the communication apparatus 2, and a tail node of the path 2 is the node corresponding to the communication apparatus 1. In other words, the communication apparatus 1 may generate the packet 1 after a fault occurs on a path on which the tail node of the path 1 is used as a head node and the head node of the path 1 is used as a tail node. In this case, the APS message 1 is used for requesting the tail node of the path 1 to switch a transmission path of traffic from the path 2 to the path 3. The path 2 and the path 3 have a same head node and tail node. The path 3 may be considered as a backup path of the path 2. The path 1 may correspond to PE1-P2-PE2 in FIG. 1B, the path 2 may correspond to PE2-P1-PE1 in FIG. 1B, and the path 3 may correspond to PE2-P2-PE1 in FIG. 1B.

As described above, the communication apparatus 1 may generate the packet 1 after a fault occurs on the path 2. In this case, the APS message 1 is used for requesting the tail node of the path 1 to switch the transmission path of traffic from the path 2 to the path 3. In this case, the packet 1 may further carry an identifier of a to-be-switched path (that is, the path 2). In this way, the APS message 1 may be used for requesting the tail node of the path 1 to switch the transmission path of traffic from the path 2 to the path 3.

In an implementation, for a 1:1 protection switching scenario or a 1+1 protection switching scenario, the identifier of the path 2 and the identifier of the path 1 may be a same identifier. In this case, the path segment identifier 1 used as the indication information 1 may be further used for identifying the path 2. In this way, in the packet 1, a path segment field may be used for indicating the APS message 1, and may also be used for requesting the tail node of the path 1 to switch the transmission path of traffic from the path 2 to the path 3. In this case, for a packet structure of the packet 1, refer to FIG. 5A. FIG. 5A is a schematic diagram of a structure of a packet 1 according to an embodiment of the present disclosure.

In FIG. 5A:

A field path segment 1 is used for carrying the path segment identifier 1.

The APS message 1 may correspond to a shaded part shown in FIG. 5A. For each field in the APS message 1, refer to related descriptions in RFC 7271, and details are not described herein.

In an example, the APS message 1 may be carried in an associated channel (ACH). In this case, the ACH may include an ACH header. The ACH header includes indication information indicating that the associated channel carries the APS message 1. In this case, an ACH header may be further included between the APS message 1 and the path segment 1 shown in FIG. 5A. In this case, a structure of the packet 1 may be shown in FIG. 5B. Both the ACH header and the APS message 1 shown in FIG. 5B are content carried by the ACH. In this case, the path segment identifier 1 is used for identifying that the packet 1 includes an ACH, and an ACH header of the ACH can indicate that the ACH carries the APS message 1.

It should be noted that, FIG. 5A and FIG. 5B are merely shown as examples, and do not constitute a limitation on embodiments of the present disclosure. For example, in some embodiments, in addition to the fields shown in FIG. 5A and FIG. 5B, the packet 1 may further include other fields.

It should be noted that, for a 1:1 protection switching scenario or a 1+1 protection switching scenario, the path segment identifier 1 may be used for identifying the path 3 and the path 4 in addition to the path 1 and the path 2. The path 4 mentioned herein is a backup path of the path 1. In other words, the path 1 and the path 4 have a same head node and tail node. For example, the path 1 corresponds to PE1-P2-PE2 shown in FIG. 1B, and the path 4 corresponds to PE1-P1-PE2 shown in FIG. 1B.

In some embodiments, it is considered that the path 2 may be used to transmit a plurality of types of service traffic, and different types of service traffic may have different quality of service requirements. To meet quality of service of service traffic having a high quality of service requirement as much as possible, in an example, after the fault occurs on the path 2, a transmission path of the service traffic having a high quality of service requirement may be preferentially switched from the path 2 to the path 3. In this case, the packet 1 may further carry an identifier of at least one service transmitted on the path 2. In this way, the APS message 1 may be used for requesting the tail node of the path 1 to switch a transmission path of the at least one service from the path 2 to the path 3.

In an example, the identifier of the at least one service may be carried by using the path segment identifier 1. For example, the identifier of the at least one service may be carried by using some bits in the path segment identifier 1. In this case, the path segment identifier 1 may be used for indicating the APS message 1, may also be used for identifying the path 2, and may also be used for identifying at least one service transmitted on the path 2. The at least one service mentioned herein may be, for example, the foregoing service traffic that has a high requirement for quality of service.

In another example, the identifier of the at least one service may be carried by using another field. For example, for the packet 1 shown in FIG. 5A, a field may be added after the APS message 1 to carry the identifier of the at least one service.

In another implementation, the identifier of the path 2 and the identifier of the path 1 may be different identifiers. In this case, the packet 1 may further include a path identifier 2, and a path segment identifier 2 is used for identifying the path 2. In an example, the path identifier 2 may be the path segment identifier 2. In this case, the node that receives the packet 1 may determine, based on the path segment identifier 2, that the APS message 1 is used for requesting the tail node of the path 1 to switch a transmission path of traffic from the path 2 to the path 3. In this case, for a packet structure of the packet 1, refer to FIG. 5C. FIG. 5C is a schematic diagram of a structure of a packet 1 according to an embodiment of the present disclosure.

In FIG. 5C:

A field path segment 1 is used for carrying the path segment identifier 1.

A field path segment 2 is used for carrying the path segment identifier 2.

The APS message 1 may correspond to a shaded part shown in FIG. 5C. For each field in the APS message 1, refer to related descriptions in RFC 7271, and details are not described herein.

In an example, the APS message 1 may be carried in an ACH. In this case, an ACH header of the ACH includes indication information indicating that the associated channel carries the APS message 1. In this case, an ACH header may be further included between the APS message 1 and the path segment 1 shown in FIG. 5C. In this case, for the structure of the packet 1, refer to FIG. 5D. Both the ACH header and the APS message 1 shown in FIG. 5D are content carried by the ACH. In this case, the path segment identifier 1 is used for identifying that the packet 1 includes an ACH, and an ACH header of the ACH can indicate that the ACH carries the APS message 1.

It should be noted that, FIG. 5C and FIG. 5D are merely shown as examples, and do not constitute a limitation on embodiments of the present disclosure. In some embodiments, in addition to the fields shown in FIG. 5C and FIG. 5D, the packet 1 may further include other fields.

It should be noted that, for a 1:1 protection switching scenario or a 1+1 protection switching scenario, the path segment identifier 1 may be used for identifying the path 4 in addition to the path 1. The path 4 mentioned herein is a backup path of the path 1. In other words, the path 1 and the path 4 have a same head node and tail node. For example, the path 1 corresponds to PE1-P2-PE2 shown in FIG. 1B, and the path 4 corresponds to PE1-P1-PE2 shown in FIG. 1B. The path segment identifier 2 may be used for identifying the path 3 in addition to the path 2. Certainly, the path segment identifier of the path 4 may be different from the path segment identifier of the path 1, and the path segment identifier of the path 3 may be different from the path segment identifier of the path 2. This is not specifically limited in embodiments of the present disclosure. In the 1:n protection switching scenario, a path segment identifier is in a one-to-one correspondence with a path identified by the path segment identifier.

As described above, it is considered that the path 2 may be used to transmit a plurality of types of service traffic, and different types of service traffic may have different quality of service requirements. To meet quality of service of service traffic having a high quality of service requirement as much as possible, in an example, after the fault occurs on the path 2, a transmission path of the service traffic having a high quality of service requirement may be preferentially switched from the path 2 to the path 3. In this case, the packet 1 may further carry an identifier of at least one service transmitted on the path 2. In this way, the APS message 1 may be used for requesting the tail node of the path 1 to switch a transmission path of the at least one service from the path 2 to the path 3.

In an example, the identifier of the at least one service may be carried by using the path segment identifier 2. For example, the identifier of the at least one service may be carried by using some bits in the path segment identifier 2. In this case, the path segment identifier 2 may be used for identifying the path 2, and may also be used for identifying at least one service transmitted on the path 2. The at least one service mentioned herein may be, for example, the foregoing service traffic that has a high requirement for quality of service.

In another example, the identifier of the at least one service may be carried by using another field. For example, for the packet 1 shown in FIG. 5C and FIG. 5D, a field may be added after the APS message 1, for example, the field path segment 2, to carry the identifier of the at least one service.

S202: The communication apparatus 1 sends the packet 1 to a communication apparatus 2.

After generating the packet 1, the communication apparatus 1 may send the packet 1 to the communication apparatus 2. Corresponding to the scenario shown in FIG. 1B, the communication apparatus 1 may send the packet 1 to the communication apparatus 2 through the intermediate node P2.

S203: The communication apparatus 2 obtains the APS message 1 from the packet 1.

After receiving the packet 1, the communication apparatus 2 may parse the packet 1, and determine, based on the indication information 1, that the packet 1 includes the APS message 1, to further obtain the APS message 1 from the packet 1. In an example, after receiving the APS message 1, the communication apparatus 2 may perform a corresponding operation based on the APS message 1.

In an example, if the APS message 1 indicates the tail node of the path 1 to switch the transmission path of traffic from the path 2 to the path 3, the communication apparatus 2 may switch the transmission path of traffic from the path 2 to the path 3.

For specific implementation of S203, refer to the related description part of S103. A difference between S203 and S103 lies in that in S103, a segment list is used to guide packet forwarding, that is, a segment list used to guide packet forwarding is encapsulated in an SRv6 packet, and in S203, an MPLS label list is used to guide packet forwarding, that is, an MPLS label list used to guide packet forwarding is encapsulated in an MPLS packet. Correspondingly, in S203, the correspondence stored in the communication apparatus 2 does not include the segment list shown in Table 1, but includes the MPLS label list.

Through the foregoing S201 to S203, the tail node of the path 1 may switch the transmission path of traffic from the path 2 to the path 3. In this process, the intermediate node on the path 2 does not need to maintain a large amount of path state information and path configuration information. The head node of the path 2 locally stores the MPLS label list of the backup path. It can be learned that, through this solution, a requirement on a data processing capability of an intermediate node on a to-be-switched path, that is, the path 2, can be reduced, to reduce deployment costs of an MPLS network.

In a possible implementation, in addition to S201 to S203, the method 200 may further include S204 to S206. Through S204 to S206, after the tail node of the path 1 switches the transmission path of traffic from the path 2 to the path 3, the head node of the path 1 can also switch the transmission path of traffic from the path 4 to the path 1.

S204: A communication apparatus 2 generates a packet 2, where the packet 2 includes an APS message 2, and the packet 2 is an MPLS packet.

In an implementation, the packet 2 is also a protocol packet. The APS message 2 is similar to the APS message 1, and is a request type message. In this case, a structure of the APS message 2 may be shown in FIG. 5A, FIG. 5B, FIG. 5C, or FIG. 5D. The APS message 2 is used for requesting the tail node of the path 1 to switch a transmission path of traffic from the path 4 to the path 1. The path 4 is a co-routed reverse path of the path 2, and the path 1 is a co-routed reverse path of the path 3.

When the structure of the APS message 2 is shown in FIG. 5A or FIG. 5B, the field path segment 1 shown in FIG. 5A or FIG. 5B is used for carrying the foregoing path segment identifier 3. The path segment identifier 3 can identify the path 3, and may also be used for identifying the path 4. In some examples, the path segment identifier 3 may be further used for identifying that at least one service is transmitted on the path 4. When a same path segment identifier is used for the path 1, the path 2, the path 3, and the path 4, the path segment identifier 3 may be the same as the path segment identifier 1 mentioned in S201. The path 3 is a transmission path of the packet 2.

When the structure of the APS message 2 is shown in FIG. 5C or FIG. 5D, the field path segment 1 shown in FIG. 5C or FIG. 5D is used for carrying the path segment identifier 3, the path segment identifier 3 can identify the path 3, and the path 3 is the transmission path of the packet 2. The field path segment 2 shown in FIG. 5C or FIG. 5D is used for carrying a path segment identifier 4. The path segment identifier 4 is used for identifying the path 4. In some examples, the path segment identifier 4 may be further used for identifying that at least one service is transmitted on the path 4. When a same path segment identifier is used for the path 1 and the path 4, the path segment identifier 4 may be the same as the path segment identifier 1 mentioned in S201. When a same path segment identifier is used for the path 2 and the path 3, the path segment identifier 3 may be the same as the path segment identifier 2 mentioned in S201.

In another implementation, the APS message 2 may be a response message of the APS message 1. In this case, in an example, the structure of the APS message 2 may be shown in FIG. 5A. In this case, a request type field of the APS message 2 may indicate, for example, that the APS message 2 is a response message. In an example, values of fields other than the request type field in the APS message 2 may be, for example, default values, or may be the same as the value of the corresponding field in the APS message 1, to indicate that the APS message 2 is a response message of the APS message 1.

S205: The communication apparatus sends the packet 2 to the communication apparatus 1.

After generating the packet 2, the communication apparatus 2 may send the packet 2 to the communication apparatus 1 through the path 3.

S206: The communication apparatus 1 obtains the APS message 2 from the packet 2.

After receiving the packet 2, the communication apparatus 1 may parse the packet 2 to obtain the APS message 2. Further, the communication apparatus 1 may perform a corresponding operation based on the APS message 2.

After the communication apparatus 1 receives the packet 2, if the APS message 2 indicates the head node of the path 1 to switch the transmission path of traffic from the path 4 to the path 1, the communication apparatus 1 may perform a corresponding processing measure based on a locally maintained APS state machine. In an example, the communication apparatus 1 may switch the transmission path of traffic from the path 4 to the path 1.

For specific implementation of S206, refer to the related description part of S106. A difference between S206 and S106 lies in that in S106, a segment list is used to guide packet forwarding, that is, a segment list used to guide packet forwarding is encapsulated in an SRv6 packet, and in S206, an MPLS label list is used to guide packet forwarding, that is, an MPLS label list used to guide packet forwarding is encapsulated in an MPLS packet. Correspondingly, in S206, the correspondence stored in the communication apparatus 1 does not include the segment list shown in Table 2, but includes the MPLS label list.

It can be learned from the foregoing method 100 and method 200 that, in both an SRv6 network and an MPLS network to which SR is applied, a path identifier may be used for indicating a protection switching message. In some embodiments, in an SRv6 network, a path segment identifier indicating a segment list may be used for indicating a protection switching message. In an MPLS network to which SR is applied, a path segment identifier indicating an MPLS label list may be used for indicating a protection switching message. In this manner, the node that receives the packet carrying the path segment identifier may determine, based on the path segment identifier, that the received packet includes the protection switching message, to further process the protection switching message.

Figure 6:
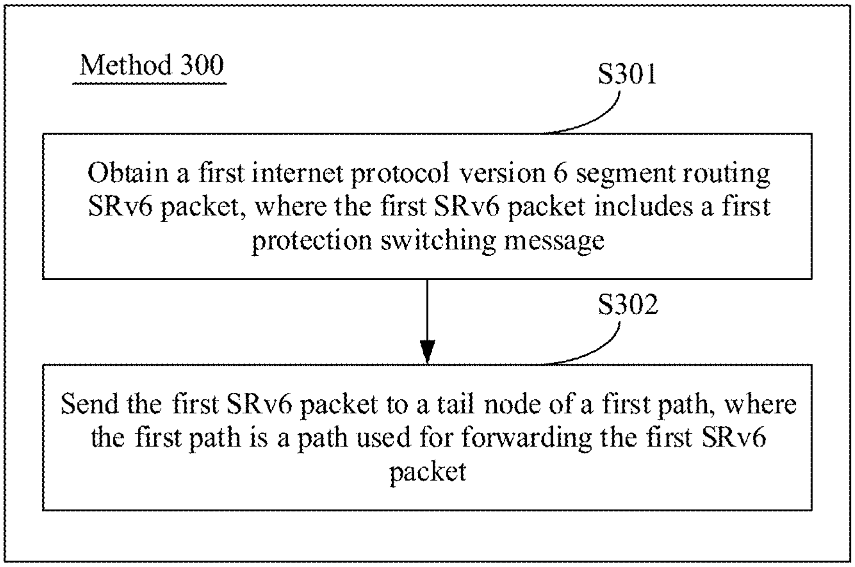
FIG. 6 is a schematic flowchart of a protection switching method according to an embodiment of the present disclosure.

An embodiment of the present disclosure further provides a protection switching method. FIG. 6 is a schematic flowchart of a protection switching method according to an embodiment of the present disclosure. A protection switching method 300 shown in FIG. 6 may include, for example, the following S301 and S302.

The method 300 may be, for example, applied to the foregoing method 100. When the method 300 is applied to the foregoing method 100, the method 300 may correspond to, for example, the steps performed by the communication apparatus 1 in the foregoing method 100, or correspond to the steps performed by the intermediate node on the path 1 in the foregoing method 100.

S301: Obtain a first internet protocol version 6 segment routing SRv6 packet, where the first SRv6 packet includes a first protection switching message.

S302: Send the first SRv6 packet to a tail node of a first path, where the first path is a path used for forwarding the first SRv6 packet.

The first SRv6 packet mentioned herein may correspond to the packet 1 in the method 100, and the first protection switching message mentioned herein may correspond to the APS message 1 in the method 100.

In an implementation, the first protection switching message is carried in an extension header of the first SRv6 packet. The extension header is: a hop-by-hop HBH option header, a destination option DOH, or a segment routing header SRH.

In an implementation, the first SRv6 packet includes first indication information, and the first indication information indicates the first protection switching message.

In an implementation, the first indication information is a first path identifier, and the first path identifier is used for identifying the first path.

The first path mentioned herein may correspond to the path 1 in the method 100, and the first path identifier mentioned herein may correspond to the path identifier 1 in the method 100.

In an implementation, the first path identifier is further used for identifying a second path, the first protection switching message is used for requesting the tail node of the first path to switch a transmission path of traffic from the second path to a third path, the second path and the third path have a same head node and tail node, the tail node of the first path is a head node of the second path, and a head node of the first path is a tail node of the second path.

The second path mentioned herein may correspond to the path identifier 2 in the method 100.

In an implementation, the first path identifier is further used for identifying at least one service transmitted on the second path, and that the first protection switching message is used for requesting the tail node of the first path to switch a transmission path of traffic from the second path to a third path includes: the first protection switching message is used for requesting the tail node of the first path to switch a transmission path of the at least one service from the second path to the third path.

The third path mentioned herein may be, for example, the path 3 in the method 100.

In an implementation, the first path identifier is a first path segment identifier.

The first path segment identifier mentioned herein may correspond to the path segment identifier 1 in the method 100.

In an implementation, the first SRv6 packet further includes a second path identifier, the second path identifier is used for identifying a second path, the first protection switching message is used for requesting the tail node of the first path to switch a transmission path of traffic from the second path to a third path, the second path and the third path have a same head node and tail node, the tail node of the first path is a head node of the second path, and a head node of the first path is a tail node of the second path.

The second path identifier mentioned herein may correspond to the path identifier 2 in the method 100. The second path mentioned herein may be, for example, the path 2 in the method 100. The third path mentioned herein may be, for example, the path 3 in the method 100.

In an implementation, the second path identifier is further used for identifying at least one service transmitted on the second path, and that the first protection switching message is used for requesting the tail node of the first path to switch a transmission path of traffic from the second path to a third path includes: the first protection switching message is used for requesting the tail node of the first path to switch a transmission path of the at least one service from the second path to the third path.

In an implementation, the second path identifier is a second path segment identifier.

The second path segment identifier mentioned herein may correspond to the path segment identifier 2 in the method 100.

In an implementation, the method further includes: receiving a second SRv6 packet through the third path, where the second SRv6 packet includes a second protection switching message, and the second protection switching message is a response message of the first protection switching message.

The second SRv6 packet mentioned herein may correspond to the packet 2 in the method 100, and the second protection switching message mentioned herein may correspond to the APS message 2 in the method 100.

In an implementation, the extension header of the first SRv6 packet includes a first type length value TLV, and the first TLV is used for carrying the first indication information and the first protection switching message.

In an implementation, the first TLV is an associated channel TLV, the associated channel TLV includes a channel type field, the channel type field is used for carrying the first indication information, and a value field of the associated channel TLV is used for carrying the first protection switching message.

In an implementation, the first SRV6 packet includes an associated channel, the associated channel is capable of carrying different types of control channels, one type of control channel is a protection switching channel, and the protection switching channel is used for carrying the first indication information and the first protection switching message.

In an implementation, the first SRV6 packet includes second indication information, and the second indication information indicates the associated channel.

The second indication information mentioned herein may correspond to the indication information 2 in the method 100.

In an implementation, the method further includes: receiving a second SRv6 packet sent by the tail node of the first path, where the second SRv6 packet includes a second protection switching message.

The second SRv6 packet mentioned herein may correspond to the packet 2 in the method 100, and the second protection switching message mentioned herein may correspond to the APS message 2 in the method 100.

For specific implementation of the foregoing method 300, refer to the related description part of the foregoing method 100.

Figure 7:
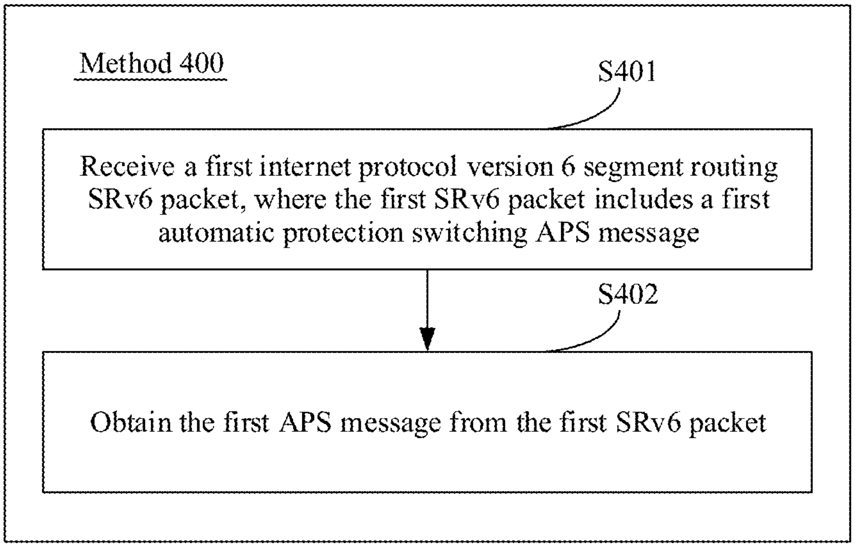
FIG. 7 is a schematic flowchart of a protection switching method according to an embodiment of the present disclosure.

An embodiment of the present disclosure further provides a protection switching method. FIG. 7 is a schematic flowchart of a protection switching method according to an embodiment of the present disclosure. A protection switching method 400 shown in FIG. 7 may include, for example, the following S401 and S402.

The method 400 may be, for example, applied to the foregoing method 100. When the method 400 is applied to the foregoing method 100, the method 400 may correspond to, for example, the steps performed by the communication apparatus 2 in the foregoing method 100.

S401: Receive a first internet protocol version 6 segment routing SRv6 packet, where the first SRv6 packet includes a first automatic protection switching APS message.

S402: Obtain the first APS message from the first SRv6 packet.

The first SRv6 packet mentioned herein may correspond to the packet 1 in the method 100, and the first protection switching message mentioned herein may correspond to the APS message 1 in the method 100.

In an implementation, the first APS message is used for requesting a tail node of a first path to switch a transmission path of traffic from a second path to a third path, the second path and the third path have a same head node and tail node, the tail node of the first path is a head node of the second path, a head node of the first path is a tail node of the second path, and the first path is a path used for forwarding the first SRv6 packet.

The first path mentioned herein may be, for example, the path 1 in the method 100. The second path mentioned herein may be, for example, the path 2 in the method 100. The third path mentioned herein may be, for example, the path 3 in the method 100.

In an implementation, the method further includes: switching, based on the first APS message, the transmission path of traffic from the second path to the third path.

In an implementation, the method further includes: sending a second SRv6 packet to the head node of the first path through the third path, where the second SRv6 packet includes a second APS message, and the second APS message is a response message of the first APS message.

The second SRv6 packet mentioned herein may correspond to the packet 2 in the method 100, and the second protection switching message mentioned herein may correspond to the APS message 2 in the method 100.

For specific implementation of the foregoing method 400, refer to the related description part of the foregoing method 100.

Figure 8:
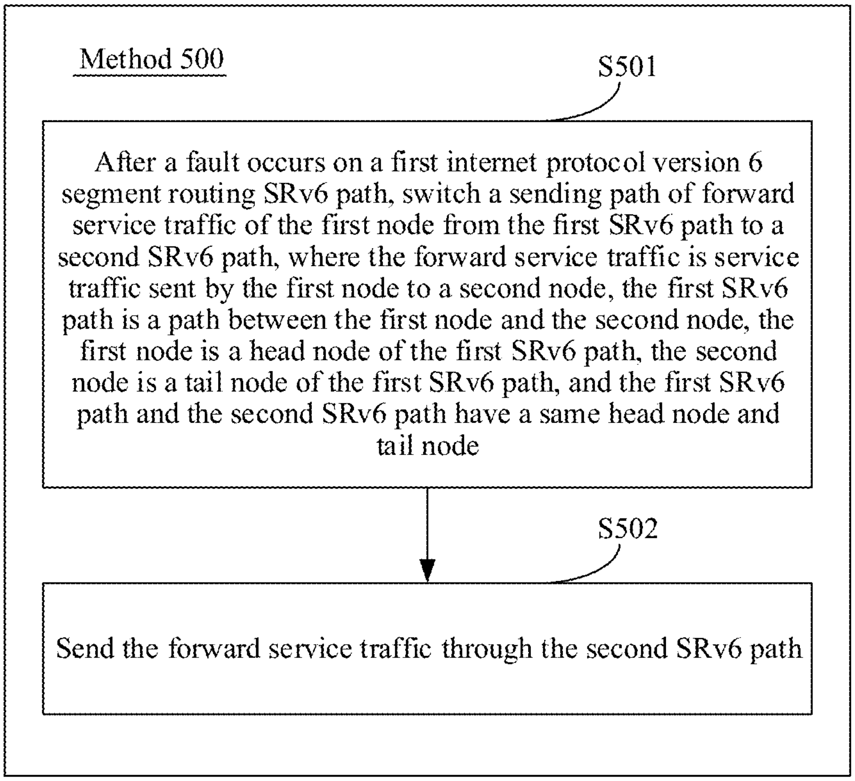
FIG. 8 is a schematic flowchart of a protection switching method according to an embodiment of the present disclosure.

An embodiment of the present disclosure further provides a protection switching method. FIG. 8 is a schematic flowchart of a protection switching method according to an embodiment of the present disclosure. A protection switching method 500 shown in FIG. 8 may include, for example, the following S501 and S502.

The method 500 may be performed by a first node, and the first node may correspond to, for example, the communication apparatus 2 in the foregoing method 100. In an example, the method 500 may correspond to, for example, the steps performed by the communication apparatus 2 in the foregoing method 100.

S501: After a fault occurs on a first internet protocol version 6 segment routing SRv6 path, switch a sending path of forward service traffic of the first node from the first SRv6 path to a second SRv6 path, where the forward service traffic is service traffic sent by the first node to a second node, the first SRv6 path is a path between the first node and the second node, the first node is a head node of the first SRv6 path, the second node is a tail node of the first SRv6 path, and the first SRv6 path and the second SRv6 path have a same head node and tail node.

S502: Send the forward service traffic through the second SRv6 path.

The first SRv6 path mentioned herein may correspond to the path 2 in the method 100, and the second SRv6 path mentioned herein may correspond to the path 3 in the method 100. The second node mentioned herein may correspond to, for example, the communication apparatus 1 in the method 100.

In an implementation, after the fault occurs on the first SRv6 path, the method further includes: switching a receiving path of reverse service traffic of the first node from a third SRv6 path to a fourth SRv6 path, where the reverse service traffic is traffic sent by the second node to the first node, a head node of the third SRv6 path is the second node, a tail node of the third SRv6 path is the first node, and the third SRv6 path and the fourth SRv6 path have a same head node and tail node; and receiving the reverse service traffic through the fourth SRv6 path.

The third SRv6 path mentioned herein may correspond to the path 4 in the method 100, and the fourth SRv6 path mentioned herein may correspond to the path 1 in the method 100.

In an implementation, the fourth SRv6 path and the second SRv6 path are bidirectional co-routed paths.

In an implementation, the first node stores a first segment list, and the first segment list is used for describing a set of segment identifiers SIDs of the second SRv6 path.

The first segment list mentioned herein may be, for example, the segment list 3 indicating the path 3 in the method 100.

In an implementation, before the first node switches a transmission path of forward service traffic from the first SRv6 path to a second SRv6 path, the method further includes:

The first node receives a first internet protocol version 6 segment routing SRv6 packet sent by the second node, where the first SRv6 packet includes a first protection switching message; and performs path switching based on the first protection switching message.

The first SRv6 packet mentioned herein may correspond to the packet 1 in the method 100, and the first protection switching message mentioned herein may correspond to the APS message 1 in the method 100.

In an implementation, the first SRv6 packet further includes first information, and the first information is used for identifying the first SRv6 path.

The first information mentioned herein may be, for example, a path identifier 1 or a path identifier 2 in the method 100. When a same path identifier is used for the path 1 and the path 2 in the method 100, the first information mentioned herein may be, for example, the path identifier 1 in the method 100. When different path identifiers are used for the path 1 and the path 2 in the method 100, the first information mentioned herein may be, for example, the path identifier 2 in the method 100.

In an implementation, that the first node stores a first segment list includes: the first node stores a correspondence between the first information and the first segment list.

In an implementation, the sending the forward service traffic through the second SRv6 path includes: determining the first segment list based on the correspondence and the first information; encapsulating the forward service traffic by using the first segment list; and sending the forward service traffic through the second SRv6 path.

In an implementation, the first information includes: a first path segment identifier.

The first path segment identifier mentioned herein may correspond to the path segment identifier 1 in the method 100.

For specific implementation of the foregoing method 500, refer to the related description part of the foregoing method 100.

Figure 9:
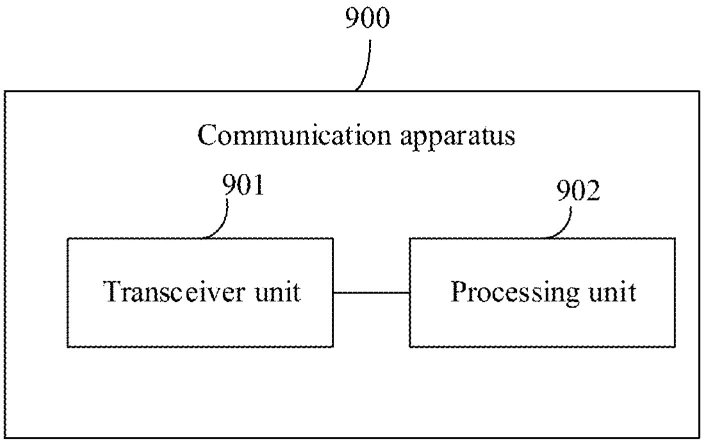
FIG. 9 is a schematic diagram of a structure of a communication apparatus according to an embodiment of the present disclosure.

In addition, an embodiment of the present disclosure further provides a communication apparatus 900, as shown in FIG. 9. FIG. 9 is a schematic diagram of a structure of a communication apparatus according to an embodiment of the present disclosure. The communication apparatus 900 includes a transceiver unit 901 and a processing unit 902.

The communication apparatus 900 may be configured to perform the method 100, the method 200, the method 300, the method 400, or the method 500 in the foregoing embodiment.

In an example, the communication apparatus 900 may perform the method 100 in the foregoing embodiment. When the communication apparatus 900 is configured to perform the method 100 in the foregoing embodiment, the transceiver unit 901 is configured to perform sending and receiving operations performed by the communication apparatus 1 in the method 100 (in the present disclosure, the sending and receiving operations are operations related to receiving and/or sending). The processing unit 902 is configured to perform an operation performed by the communication apparatus 1 in the method 100 other than the sending and receiving operations. For example, the processing unit 902 is configured to generate a packet 1, where the packet 1 includes an APS message 1, and the packet 1 is an SRv6 packet. The transceiver unit 901 is configured to send the packet 1 to a communication apparatus 2.

In an example, the communication apparatus 900 may perform the method 100 in the foregoing embodiment. When the communication apparatus 900 is configured to perform the method 100 in the foregoing embodiment, the transceiver unit 901 is configured to perform sending and receiving operations performed by the communication apparatus 2 in the method 100. The processing unit 902 is configured to perform an operation performed by the communication apparatus 2 in the method 100 other than the sending and receiving operations. For example, the transceiver unit 901 is configured to receive the packet 1, where the packet 1 includes an APS message 1, and the packet 1 is an SRv6 packet. The processing unit 902 is configured to obtain the APS message 1 from the packet 1.

In an example, the communication apparatus 900 may perform the method 200 in the foregoing embodiment. When the communication apparatus 900 is configured to perform the method 200 in the foregoing embodiment, the transceiver unit 901 is configured to perform sending and receiving operations performed by the communication apparatus 1 in the method 200. The processing unit 902 is configured to perform an operation performed by the communication apparatus 1 in the method 200 other than the sending and receiving operations. For example, the processing unit 902 is configured to generate a packet 1, where the packet 1 includes an APS message 1, and the packet 1 is an MPLS packet. The transceiver unit 901 is configured to send the packet 1 to a communication apparatus 2.

In an example, the communication apparatus 900 may perform the method 200 in the foregoing embodiment. When the communication apparatus 900 is configured to perform the method 200 in the foregoing embodiment, the transceiver unit 901 is configured to perform sending and receiving operations performed by the communication apparatus 2 in the method 200. The processing unit 902 is configured to perform an operation performed by the communication apparatus 2 in the method 200 other than the sending and receiving operations. For example, the transceiver unit 901 is configured to receive the packet 1, where the packet 1 includes an APS message 1, and the packet 1 is an MPLS packet. The processing unit 902 is configured to obtain the APS message 1 from the packet 1.

In an example, the communication apparatus 900 may perform the method 300 in the foregoing embodiment. When the communication apparatus 900 is configured to perform the method 300 in the foregoing embodiment, the transceiver unit 901 is configured to perform sending and receiving operations in the method 300. The processing unit 902 is configured to perform an operation other than the sending and receiving operations in the method 300. For example, the processing unit 902 is configured to obtain a first internet protocol version 6 segment routing SRv6 packet, where the first SRv6 packet includes a first protection switching message. The transceiver unit 901 is configured to send the first SRv6 packet to a tail node of a first path, where the first path is a path used for forwarding the first SRv6 packet.

In an example, the communication apparatus 900 may perform the method 400 in the foregoing embodiment. When the communication apparatus 900 is configured to perform the method 400 in the foregoing embodiment, the transceiver unit 901 is configured to perform sending and receiving operations in the method 400. The processing unit 902 is configured to perform an operation other than the sending and receiving operations in the method 400. For example, the transceiver unit 901 is configured to receive a first internet protocol version 6 segment routing SRv6 packet, where the first SRv6 packet includes a first automatic protection switching APS message. The processing unit 902 is configured to obtain the first APS message from the first SRv6 packet.

In an example, the communication apparatus 900 may perform the method 500 in the foregoing embodiment. When the communication apparatus 900 is configured to perform the method 500 in the foregoing embodiment, the transceiver unit 901 is configured to perform sending and receiving operations in the method 500. The processing unit 902 is configured to perform an operation other than the sending and receiving operations in the method 500. For example, the processing unit 902 is configured to: after a fault occurs on a first internet protocol version 6 segment routing SRv6 path, switch a sending path of forward service traffic of the first node from the first SRv6 path to a second SRv6 path, where the forward service traffic is service traffic sent by the first node to a second node, the first SRv6 path is a path between the first node and the second node, the first node is a head node of the first SRv6 path, the second node is a tail node of the first SRv6 path, and the first SRv6 path and the second SRv6 path have a same head node and tail node. The transceiver unit 901 is configured to send the forward service traffic through the second SRv6 path.

Figure 10:
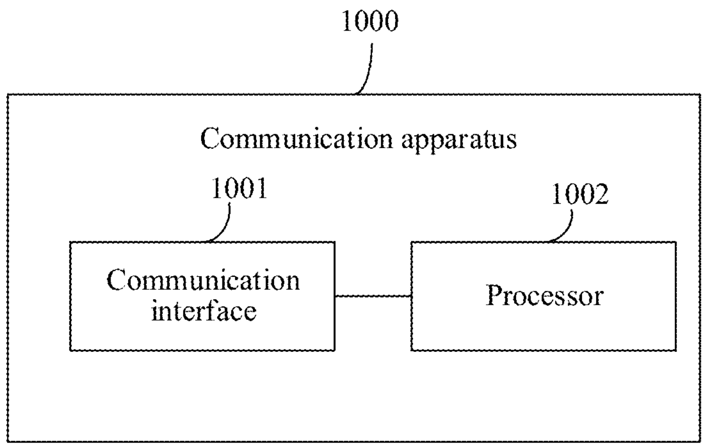
FIG. 10 is a schematic diagram of a structure of a communication apparatus according to an embodiment of the present disclosure.

In addition, an embodiment of the present disclosure further provides a communication apparatus 1000. FIG. 10 is a schematic diagram of a structure of a communication apparatus according to an embodiment of the present disclosure. The communication apparatus 1000 includes a communication interface 1001 and a processor 1002 connected to the communication interface 1001. The communication apparatus 1000 may be configured to perform the method 100, the method 200, the method 300, the method 400, or the method 500 in the foregoing embodiment.

In an example, the communication apparatus 1000 may perform the method 100 in the foregoing embodiment. When the communication apparatus 1000 is configured to perform the method 100 in the foregoing embodiment, the communication interface 1001 is configured to perform sending and receiving operations performed by the communication apparatus 1 in the method 100. The processor 1002 is configured to perform an operation performed by the communication apparatus 1 in the method 100 other than the sending and receiving operations. For example, the processor 1002 is configured to generate a packet 1, where the packet 1 includes an APS message 1, and the packet 1 is an SRv6 packet. The communication interface 1001 is configured to send the packet 1 to a communication apparatus 2.

In an example, the communication apparatus 1000 may perform the method 100 in the foregoing embodiment. When the communication apparatus 1000 is configured to perform the method 100 in the foregoing embodiment, the communication interface 1001 is configured to perform sending and receiving operations performed by the communication apparatus 2 in the method 100. The processor 1002 is configured to perform an operation performed by the communication apparatus 2 in the method 100 other than the sending and receiving operations. For example, the communication interface 1001 is configured to receive the packet 1, where the packet 1 includes an APS message 1, and the packet 1 is an SRv6 packet. The processor 1002 is configured to obtain the APS message 1 from the packet 1.

In an example, the communication apparatus 1000 may perform the method 200 in the foregoing embodiment. When the communication apparatus 1000 is configured to perform the method 200 in the foregoing embodiment, the communication interface 1001 is configured to perform sending and receiving operations performed by the communication apparatus 1 in the method 200. The processor 1002 is configured to perform an operation performed by the communication apparatus 1 in the method 200 other than the sending and receiving operations. For example, the processor 1002 is configured to generate a packet 1, where the packet 1 includes an APS message 1, and the packet 1 is an MPLS packet. The communication interface 1001 is configured to send the packet 1 to a communication apparatus 2.

In an example, the communication apparatus 1000 may perform the method 200 in the foregoing embodiment. When the communication apparatus 1000 is configured to perform the method 200 in the foregoing embodiment, the communication interface 1001 is configured to perform sending and receiving operations performed by the communication apparatus 2 in the method 200. The processor 1002 is configured to perform an operation performed by the communication apparatus 2 in the method 200 other than the sending and receiving operations. For example, the communication interface 1001 is configured to receive the packet 1, where the packet 1 includes an APS message 1, and the packet 1 is an MPLS packet. The processor 1002 is configured to obtain the APS message 1 from the packet 1.

In an example, the communication apparatus 1000 may perform the method 300 in the foregoing embodiment. When the communication apparatus 1000 is configured to perform the method 300 in the foregoing embodiment, the communication interface 1001 is configured to perform the sending and receiving operations in the method 300. The processor 1002 is configured to perform an operation other than the sending and receiving operations in the method 300. For example, the processor 1002 is configured to obtain a first internet protocol version 6 segment routing SRv6 packet, where the first SRv6 packet includes a first protection switching message. The communication interface 1001 is configured to send the first SRv6 packet to a tail node of a first path, where the first path is a path used for forwarding the first SRv6 packet.

In an example, the communication apparatus 1000 may perform the method 400 in the foregoing embodiment. When the communication apparatus 1000 is configured to perform the method 400 in the foregoing embodiment, the communication interface 1001 is configured to perform the sending and receiving operations in the method 400. The processor 1002 is configured to perform an operation other than the sending and receiving operations in the method 400. For example, the communication interface 1001 is configured to receive a first internet protocol version 6 segment routing SRv6 packet, where the first SRv6 packet includes a first automatic protection switching APS message. The processor 1002 is configured to obtain the first APS message from the first SRv6 packet.

In an example, the communication apparatus 1000 may perform the method 500 in the foregoing embodiment. When the communication apparatus 1000 is configured to perform the method 500 in the foregoing embodiment, the communication interface 1001 is configured to perform the sending and receiving operations in the method 500. The processor 1002 is configured to perform an operation other than the sending and receiving operations in the method 500. For example, the processor 1002 is configured to: after a fault occurs on a first internet protocol version 6 segment routing SRv6 path, switch a sending path of forward service traffic of the first node from the first SRv6 path to a second SRv6 path, where the forward service traffic is service traffic sent by the first node to a second node, the first SRv6 path is a path between the first node and the second node, the first node is a head node of the first SRv6 path, the second node is a tail node of the first SRv6 path, and the first SRv6 path and the second SRv6 path have a same head node and tail node. The communication interface 1001 is configured to send the forward service traffic through the second SRv6 path.

Figure 11:
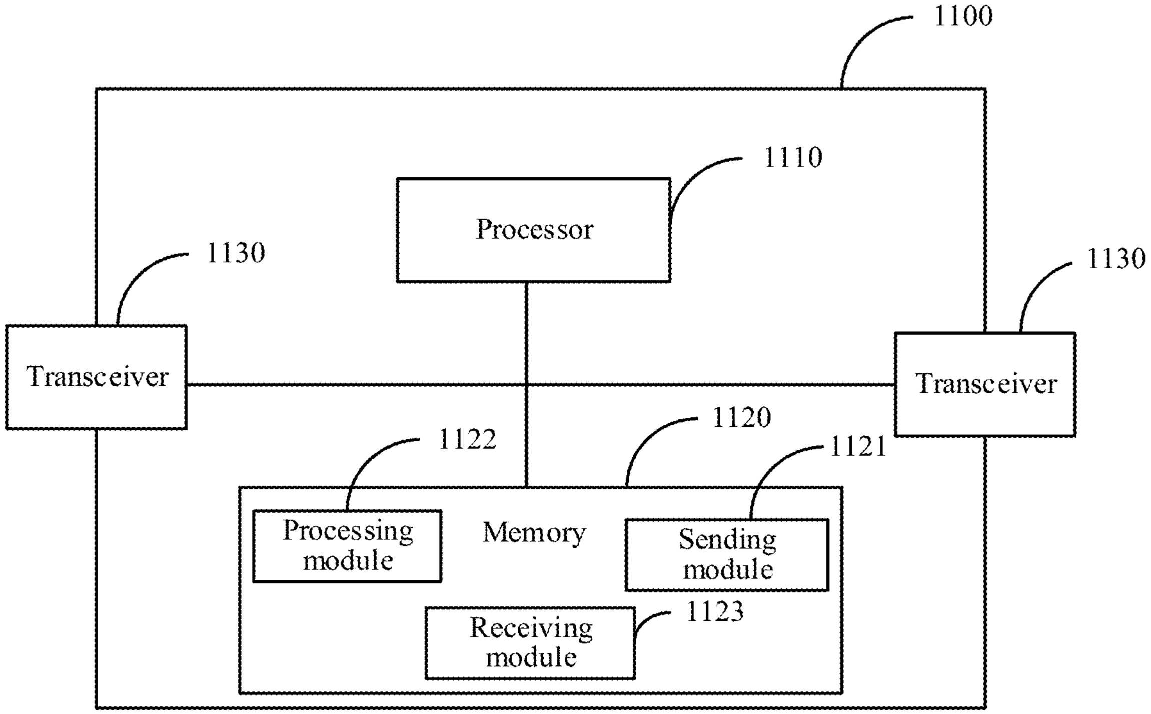
FIG. 11 is a schematic diagram of a structure of a communication apparatus according to an embodiment of the present disclosure.

In addition, an embodiment of the present disclosure further provides a communication apparatus 1100. FIG. 11 is a schematic diagram of a structure of a communication apparatus according to an embodiment of the present disclosure.

The communication apparatus 1100 may be configured to perform the method 100, the method 200, the method 300, the method 400, or the method 500 in the foregoing embodiment.

As shown in FIG. 11, the communication apparatus 1100 may include a processor 1110, a memory 1120 coupled to the processor 1110, and a transceiver 1130. The transceiver 1130 may be, for example, a communication interface, an optical module, or the like. The processor 1110 may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1110 may be one processor, or may include a plurality of processors. The memory 1120 may include a volatile memory, for example, a random-access memory (RAM); the memory may further include a non-volatile memory, for example, a read-only memory (ROM), a flash memory, a hard disk drive (HDD), or a solid-state drive (SSD). The memory 1120 may further include a combination of the foregoing memories. The memory 1120 may be one memory, or may include a plurality of memories. In an implementation, the memory 1120 stores computer-readable instructions, and the computer-readable instructions include a plurality of software modules, for example, a sending module 1121, a processing module 1122, and a receiving module 1123. After executing each software module, the processor 1110 may perform a corresponding operation based on an indication of each software module. In this embodiment, an operation performed by a software module is actually the operation performed by the processor 1110 based on the indication of the software module.

In an example, the communication apparatus 1100 may perform the method 100 in the foregoing embodiment. When the communication apparatus 1100 is configured to perform the method 100 in the foregoing embodiment, the transceiver 1130 is configured to perform sending and receiving operations performed by the communication apparatus 1 in the method 100. The processor 1110 is configured to perform an operation performed by the communication apparatus 1 in the method 100 other than the sending and receiving operations. For example, the processor 1110 is configured to generate a packet 1, where the packet 1 includes an APS message 1, and the packet 1 is an SRv6 packet. The transceiver 1130 is configured to send the packet 1 to a communication apparatus 2.

In an example, the communication apparatus 1100 may perform the method 100 in the foregoing embodiment. When the communication apparatus 1100 is configured to perform the method 100 in the foregoing embodiment, the transceiver 1130 is configured to perform sending and receiving operations performed by the communication apparatus 2 in the method 100. The processor 1110 is configured to perform an operation performed by the communication apparatus 2 in the method 100 other than the sending and receiving operations. For example, the transceiver 1130 is configured to receive the packet 1, where the packet 1 includes an APS message 1, and the packet 1 is an SRv6 packet. The processor 1110 is configured to obtain the APS message 1 from the packet 1.

In an example, the communication apparatus 1100 may perform the method 200 in the foregoing embodiment. When the communication apparatus 1100 is configured to perform the method 200 in the foregoing embodiment, the transceiver 1130 is configured to perform sending and receiving operations performed by the communication apparatus 1 in the method 200. The processor 1110 is configured to perform an operation performed by the communication apparatus 1 in the method 200 other than the sending and receiving operations. For example, the processor 1110 is configured to generate a packet 1, where the packet 1 includes an APS message 1, and the packet 1 is an MPLS packet. The transceiver 1130 is configured to send the packet 1 to a communication apparatus 2.

In an example, the communication apparatus 1100 may perform the method 200 in the foregoing embodiment. When the communication apparatus 1100 is configured to perform the method 200 in the foregoing embodiment, the transceiver 1130 is configured to perform sending and receiving operations performed by the communication apparatus 2 in the method 200. The processor 1110 is configured to perform an operation performed by the communication apparatus 2 in the method 200 other than the sending and receiving operations. For example, the transceiver 1130 is configured to receive the packet 1, where the packet 1 includes an APS message 1, and the packet 1 is an MPLS packet. The processor 1110 is configured to obtain the APS message 1 from the packet 1.

In an example, the communication apparatus 1100 may perform the method 300 in the foregoing embodiment. When the communication apparatus 1100 is configured to perform the method 300 in the foregoing embodiment, the transceiver 1130 is configured to perform sending and receiving operations in the method 300. The processor 1110 is configured to perform an operation other than the sending and receiving operations in the method 300. For example, the processor 1110 is configured to obtain a first internet protocol version 6 segment routing SRv6 packet, where the first SRv6 packet includes a first protection switching message. The transceiver 1130 is configured to send the first SRv6 packet to a tail node of a first path, where the first path is a path used for forwarding the first SRv6 packet.

In an example, the communication apparatus 1100 may perform the method 400 in the foregoing embodiment. When the communication apparatus 1100 is configured to perform the method 400 in the foregoing embodiment, the transceiver 1130 is configured to perform sending and receiving operations in the method 400. The processor 1110 is configured to perform an operation other than the sending and receiving operations in the method 400. For example, the transceiver 1130 is configured to receive a first internet protocol version 6 segment routing SRv6 packet, where the first SRv6 packet includes a first automatic protection switching APS message. The processor 1110 is configured to obtain the first APS message from the first SRv6 packet.

In an example, the communication apparatus 1100 may perform the method 500 in the foregoing embodiment. When the communication apparatus 1100 is configured to perform the method 500 in the foregoing embodiment, the transceiver 1130 is configured to perform sending and receiving operations in the method 500. The processor 1110 is configured to perform an operation other than the sending and receiving operations in the method 500. For example, the processor 1110 is configured to: after a fault occurs on a first internet protocol version 6 segment routing SRv6 path, switch a sending path of forward service traffic of the first node from the first SRv6 path to a second SRv6 path, where the forward service traffic is service traffic sent by the first node to a second node, the first SRv6 path is a path between the first node and the second node, the first node is a head node of the first SRv6 path, the second node is a tail node of the first SRv6 path, and the first SRv6 path and the second SRv6 path have a same head node and tail node. The transceiver 1130 is configured to send the forward service traffic through the second SRv6 path.

The present disclosure further provides a computer-readable storage medium. The computer-readable storage medium stores instructions. When the instructions are run on a computer, the computer is enabled to perform any one or more operations in the method (for example, the method 100, the method 200, the method 300, the method 400, and the method 500) in any one of the foregoing embodiments.

The present disclosure further provides a computer program product, including a computer program. When the computer program is run on a computer, the computer is enabled to perform any one or more operations in the method (for example, the method 100, the method 200, the method 300, the method 400, and the method 500) in any one of the foregoing embodiments.

The present disclosure further provides a communication system, including the communication apparatus 1 for performing the method 100 and the communication apparatus 2 for performing the method 100 mentioned in the foregoing embodiments, or including the communication apparatus 1 for performing the method 200 and the communication apparatus 2 for performing the method 200 mentioned in the foregoing embodiments.

The present disclosure further provides a communication system, including the communication apparatus for performing the method 300 and the communication apparatus for performing the method 400 mentioned in the foregoing embodiments, or including the communication apparatus for performing the method 300 and the communication apparatus for performing the method 500 mentioned in the foregoing embodiments.

The present disclosure further provides a communication system, including at least one memory and at least one processor. The at least one memory stores instructions, and the at least one processor executes the instructions, so that the communication system performs any one or more operations in the method 100 in the foregoing embodiments of the present disclosure, or the communication system performs any one or more operations in the method 200 in the foregoing embodiments of the present disclosure.

In the specification, claims, and accompanying drawings of the present disclosure, the terms "first", "second", "third", "fourth", and the like (if used) are intended to distinguish between similar objects but do not necessarily indicate a specific order or sequence. It should be understood that the data termed in such a way is interchangeable in proper circumstances so that the embodiments described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by a person skilled in the art that, for the purpose of convenient and brief description, for detailed working processes of the foregoing system, apparatus, and unit, refer to corresponding processes in the foregoing method embodiments.

In several embodiments provided in the present disclosure, it can be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

In addition, service units in embodiments of the present disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of the present disclosure essentially, or a part contributing to the conventional technology, or all or some of the technical solutions may be implemented in a form of a software product. The computer software product is stored in a storage medium and includes a plurality of instructions for instructing a computer device (which may be a personal computer, a server, a network device, or the like) to perform all or some of the steps of the methods in embodiments of the present disclosure. The foregoing storage medium includes: any medium that can store program code, such as a Universal Serial Bus (USB) flash drive, a removable hard disk, a ROM, a RAM, a magnetic disk, or an optical disc.

A person skilled in the art should be aware that in the foregoing one or more examples, services described in the present disclosure may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium that can be accessed by a general-purpose or a dedicated computer.

The objectives, technical solutions, and beneficial effects of the present disclosure have been further described in detail in the foregoing specific implementations. It can be understood that the foregoing descriptions are merely specific implementations of the present disclosure.

The foregoing embodiments are merely intended for describing the technical solutions of the present disclosure instead of limiting the present disclosure. Although the present disclosure is described in detail with reference to the foregoing embodiments, person of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A method comprising:

obtaining a first Segment Routing over IPv6 (SRv6) packet comprising a first protection switching message, wherein the first protection switching message is for requesting a first tail node to switch a transmission path of traffic from a second path to a third path, wherein the second path and the third path have a same second head node and a second tail node, wherein the first tail node is the second head node, and wherein a first head node of a first path is the second tail node; and sending the first SRv6 packet to the first tail node of the first path, wherein the first path is for forwarding the first SRv6 packet.

2. The method of claim 1, wherein the first SRv6 packet comprises an extension header comprising the first protection switching message, and wherein the extension header is a hop-by-hop (HBH) option header, a destination option header (DOH), or a segment routing header (SRH).

3. The method of claim 1, wherein the first SRv6 packet comprises first indication information indicating the first protection switching message.

4. The method of claim 3, wherein the first indication information is a first path identifier for identifying the first path.

5. The method of claim 4, wherein the first path identifier further identifies a second path.

6. The method of claim 5, wherein the first path identifier is further for identifying at least one service transmitted on the second path, and wherein the first protection switching message is for requesting the first tail node to switch the transmission path of the at least one service from the second path to the third path.

7. The method of claim 4, wherein the first path identifier is a first path segment identifier.

8. The method of claim 4, wherein the first SRv6 packet further comprises a second path identifier for identifying a second path, wherein the first protection switching message is for requesting the first tail node to switch a transmission path of traffic from the second path to a third path, wherein the second path and the third path have a same second head node and second tail node, wherein the first tail node is the second head node, and wherein a first head node of the first path is the second tail node.

9. The method of claim 8, wherein the second path identifier is further for identifying at least one service transmitted on the second path, and wherein the first protection switching message is for requesting the first tail node to switch the transmission path of the at least one service from the second path to the third path.

10. A method comprising:

receiving a first Segment Routing over IPv6 (SRv6) packet comprising a first protection switching message, wherein the first protection switching message is for requesting a first tail node of a first path to switch a transmission path of traffic from a second path to a third path, wherein the second path and the third path have a same second head node and second tail node, wherein the first tail node is the second head node, and wherein a first head node of the first path is the second tail node; and obtaining the first protection switching message from the first SRv6 packet.

11. The method of claim 10, wherein the first path is for forwarding the first SRv6 packet.

12. The method of claim 11, further comprising switching, based on the first protection switching message, the transmission path from the second path to the third path.

13. The method of claim 12, further comprising sending a second SRv6 packet to the first head node through the third path, wherein the second SRv6 packet comprises a second protection switching message, and wherein the second protection switching message is a response message of the first protection switching message.

14. A network node comprising:

a memory configured to store instructions, and one or more processors configured to execute the instructions to:

obtain an Internet Protocol version 6 segment routing (SRv6) packet comprising a first protection switching message, wherein the first protection switching message is for requesting a first tail node to switch a transmission path of traffic from a second path to a third path, wherein the second path and the third path have a same second head node and a second tail node, wherein the first tail node is the second head node, and wherein a first head node of a first path is the second tail node; and send the first SRv6 packet to a first tail node of a forwarding path of the first SRv6 packet.

15. The network node according to claim 14, wherein the first SRv6 packet comprises an extension header comprising the first protection switching message, and wherein the extension header is a hop-by-hop (HBH) option header, a destination option header (DOH), or a segment routing header (SRH).

16. The network node according to claim 14, wherein the first SRv6 packet comprises first indication information indicating the first protection switching message.

17. The network node according to claim 16, wherein the first indication information is a first path identifier for identifying the first path.

18. The network node according to claim 17, wherein the first path identifier further identifies a second path.

19. The network node according to claim 18, wherein the first path identifier further identifies at least one service transmitted on the second path, and wherein the first protection switching message is for requesting the first tail node to switch the transmission path of the at least one service from the second path to the third path.

20. The network node according to claim 18, wherein the first path identifier is a first path segment identifier.

* * * * *